United States Patent
Dahan

(10) Patent No.: US 10,607,009 B2
(45) Date of Patent: Mar. 31, 2020

(54) SYSTEM AND METHOD FOR BLOCKING RANSOMWARE INFECTIONS

(71) Applicant: Asher Dahan, Los Angeles, CA (US)

(72) Inventor: Asher Dahan, Los Angeles, CA (US)

(73) Assignee: Block Ransomware, LLC, Los Angeles, CA (US)

( * ) Notice: Subject to any disclaimer, the term of this patent is extended or adjusted under 35 U.S.C. 154(b) by 174 days.

(21) Appl. No.: 15/945,735

(22) Filed: Apr. 4, 2018

(65) Prior Publication Data
US 2018/0293379 A1    Oct. 11, 2018

Related U.S. Application Data

(60) Provisional application No. 62/481,819, filed on Apr. 5, 2017.

(51) Int. Cl.
| | |
|---|---|
| H04L 29/06 | (2006.01) |
| G06F 21/55 | (2013.01) |
| G06F 21/56 | (2013.01) |

(52) U.S. Cl.
CPC .......... G06F 21/554 (2013.01); G06F 21/566 (2013.01); G06F 21/568 (2013.01); H04L 63/145 (2013.01); H04L 63/1416 (2013.01); H04L 63/1491 (2013.01); G06F 2221/034 (2013.01)

(58) Field of Classification Search
CPC ...... G06F 21/554; G06F 21/56; G06F 21/561; G06F 21/566; G06F 21/568; H04L 63/1416; H04L 63/145; H04L 63/1491
See application file for complete search history.

(56) References Cited

U.S. PATENT DOCUMENTS

| | | | |
|---|---|---|---|
| 9,317,686 B1 | 4/2016 | Ye et al. | |
| 9,514,309 B1 | 12/2016 | Mann | |
| 9,734,337 B1 | 8/2017 | Patton et al. | |
| 9,753,796 B2 * | 9/2017 | Mahaffey | H04L 41/142 |
| 9,836,512 B1 * | 12/2017 | Singh | G06F 21/552 |
| 9,852,289 B1 | 12/2017 | Mann | |
| 9,888,032 B2 | 2/2018 | Dekel et al. | |
| 9,935,973 B2 * | 4/2018 | Crofton | H04L 63/145 |
| 10,083,299 B2 * | 9/2018 | Crofton | G06F 21/566 |
| 10,122,752 B1 * | 11/2018 | Soman | H04L 63/1441 |
| 2005/0010838 A1 | 1/2005 | Davies | |
| 2016/0162886 A1 | 6/2016 | Howe | |
| 2016/0164894 A1 | 6/2016 | Zeitlin et al. | |

(Continued)

OTHER PUBLICATIONS

The International Searching Authority, Notification of Transmittal of the International Search Report and the Written Opinion of the International Searching Authority for International Application PCT/US2018/026193, dated Jul. 31, 2018, United States.

*Primary Examiner* — Hosuk Song
(74) *Attorney, Agent, or Firm* — Kevin Schraven; Anooj Patel; Hankin Patent Law, APC

(57) ABSTRACT

The present disclosure is directed to a ransomware detection component or an anti-ransomware application that detects, stops, and removes ransomware from a computing system. In one embodiment, the anti-ransomware application may prevent new ransomware from infecting one or more components of the system or remove or disable existing ransomware that is already present on the system.

20 Claims, 12 Drawing Sheets

(56) References Cited

U.S. PATENT DOCUMENTS

| | | |
|---|---|---|
| 2016/0323316 A1 | 11/2016 | Kolton et al. |
| 2016/0378988 A1 | 12/2016 | Bhashkar et al. |
| 2017/0034189 A1 | 2/2017 | Powell |
| 2017/0140156 A1 | 5/2017 | Gu et al. |
| 2017/0308711 A1 | 10/2017 | Barak |
| 2017/0366563 A1 | 12/2017 | Volfman et al. |
| 2018/0018458 A1 | 1/2018 | Schmugar et al. |
| 2018/0034835 A1 | 2/2018 | Iwanir et al. |

* cited by examiner

SYSTEM AND METHOD FOR BLOCKING RANSOMWARE INFECTIONS

CROSS-REFERENCE TO RELATED APPLICATION

This application claims the benefit of U.S. Provisional Application No. 62/481,819, filed on Apr. 5, 2017, entitled "System and Method for Blocking Ransomware Infections", the contents of which are incorporated herein by reference as though set forth in their entirety.

BACKGROUND

Malware is any software used to disrupt computer operations, gather sensitive information, or gain access to private assets residing in computing systems. Ransomware is a type of malware that restricts access to the infected computing system in some way and demands that the user of the computing system pay a ransom to the malware operator to remove the restriction. Certain forms of ransomware restrict access to the computing system by systematically encrypting files stored on the computing system, making it nearly impossible to decrypt and access the files without paying the ransom. Other forms of ransomware restrict access to the computing system by locking the computing system, thereby disabling the user from accessing the computing system. Unfortunately, the encryption of important files may result in data loss and/or may comprise functionality of the computing system.

Traditional security systems are often designed to prevent malware from being inadvertently installed by the user, but may have no means of detecting or removing malware once it has been installed. In addition, even if a conventional system were able to remove installed ransomware, it is often too late as the user's files have already been encrypted.

SUMMARY

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented hereinbelow. It is to be understood that both the following general description and the following detailed description are exemplary and explanatory only and are not restrictive.

In accordance with the embodiments disclosed herein, the present disclosure is directed to a ransomware detection component or an anti-ransomware application that detects, stops, and removes ransomware from a computing system. In one embodiment, the anti-ransomware application may prevent new ransomware from infecting one or more components of the system or remove or disable existing ransomware that is already present on the system.

The anti-ransomware application of the present disclosure may include at least one monitoring module for monitoring activities that occur within occur within the computing system. In one embodiment, the at least one monitoring module monitors selected activities, including, but not limited to, file accesses, network accesses, application accesses, registry accesses, file creations, file modifications, process calls, and process creations. The at least one monitoring module may be configured to monitor any number of components within a computing system, and may be modified should components be added, deleted, or replaced.

In one embodiment, the anti-ransomware application may include a honeypot deployment module which creates and strategically deploys honeypot drives and/or honeypot files in one or more shared resources resident on the computing system. In a preferred embodiment, the honeypot deployment module deploys honeypot drives within a majority of the valid shared resources. In a more preferred embodiment, the honeypot deployment module deploys honeypot drives surrounding each valid shared resource on the computing system.

In another embodiment, the anti-ransomware application of the present disclosure may comprise a trigger rule module that analyzes at least a portion of activities monitored by the at least one monitoring module, particularly those activities with respect to one or more of the deployed honeypot drives and/or honeypot files. The trigger rule module may also determine, based on the analysis, that one or more of the monitored activities represents a possible ransomware attack.

In another embodiment, the anti-ransomware application may comprise an action script module for performing one or more security actions in response to possible threats to the computing system. In a preferred embodiment, the action script module performs the one or more security actions in response to the determination by the trigger rule module that one or more of the detected monitored activities represents a possible ransomware attack. In one embodiment, the action script module may be configured to invoke action scripts to perform any number of security actions in response to a possible ransomware attack.

In one embodiment, the anti-ransomware application may comprise a database for storing at least a portion of the monitored activities for further processing and analysis. In one embodiment, the anti-ransomware application may be operable to generate reports with respect to the stored data.

In accordance with the embodiments disclosed herein, the present disclosure may provide a system for mitigating the effects of ransomware attacks. The system may comprise a plurality of computing devices and storage devices interconnected via a network. Each storage device may be configured to store a plurality of data files in a plurality of file directories, wherein a select number of the plurality of storage devices include at least one shared file directory for storing a plurality of data files therein, wherein each shared file directory may be configured to allow access to data files stored therein to a select number of the plurality of computing devices via the network. The system may further comprise a ransomware detection component connected to a select number of the plurality of computing devices and storage devices via the network, wherein the ransomware detection component may be configured to detect possible ransomware attacks.

The ransomware detection component may comprise a honeypot deployment module configured to selectively deploy a plurality of honeypot data items into a select number of the plurality of storage devices, wherein the honeypot data items comprise honeypot drives, honeypot files, and combinations thereof. In one embodiment, a select number of the plurality of deployed honeypot data items may be accessible to selected users of the system. In another embodiment, the honeypot deployment module may deploy at least one honeypot data item into a majority of the shared file directories.

The ransomware detection application may further comprise a monitoring module, wherein the monitoring module may be configured to monitor a plurality of activities executed on data files stored in a select number of the plurality of storage devices, detect activities executed on data files that conform to at least one of a predefined set of activities, and generate a plurality of event data associated with each detected activity. In one embodiment, the plurality of monitored activities may comprise activities associated with predefined file types, predefined file activities, predefined directory activities, predefined user activities, predefined processes, and combinations thereof.

The ransomware detection component also may comprise a trigger rule module configured to determine, based on event data associated with each detected activity, whether a detected activity is indicative of a ransomware attack by a third party not authorized to execute such detected activity. In addition, the ransomware detection component may include an action script module configured to execute, based on a determination by the trigger rule module that a detected activity is indicative of a ransomware attack, at least one action script to mitigate access to shared data files should the detected activity be a ransomware attack. The ransomware detection component may further include a database module configured to store at least a portion of event data associated with detected activities.

In one embodiment, the trigger rule module may be configured determine whether an occurrence of a detected activity exceeds a predetermined threshold level associated with such activity; and based on whether the predetermined threshold is exceeded, determine whether the detected activity is indicative of a ransomware attack. In another embodiment, the database may be configured to store threshold data associated with a plurality of predetermined threshold levels with respect to selected activities executed on data files. In such embodiment, the trigger rule module may be configured to access threshold data associated with a selected detected activity to determine whether the occurrence thereof exceeds the predetermined threshold level.

In one embodiment, at least one action script may comprise at least one security action selected from the group consisting of preventing at least one process from accessing data files stored in at least one of the plurality of storage devices; suspending at least one process executing on data files stored in at least one of the plurality of storage devices; creating a backup copy of at least a portion of data files stored in at least one of the plurality of storage devices; terminating processes on at least one of the plurality of storage devices and plurality of computing devices; generating at least one alert in response to a determination that a detected activity is indicative of a ransomware attack; restricting access to the system of at least one user associated with a detected activity that is determined to be indicative of a ransomware attack; quarantining at least one of the plurality of storage devices and plurality of computing devices on which a detected activity is executed that is determined to be indicative of a ransomware attack; and combinations thereof.

In another embodiment, the database may be configured to store a plurality of action scripts associated with a plurality of detected activities executed on data files, and the action script module may be configured to access at least one action script associated with a selected detected activity to mitigate access to shared data files should the detected activity be a ransomware attack.

In a preferred embodiment, the ransomware detection component may comprise a plurality of monitoring modules.

Each monitoring module may be configured to monitor a plurality of activities executed on data files stored in a select number of the plurality of storage devices; detect activities executed on honeypot data items that conform to at least one of a predefined set of activities; generate a plurality of event data associated with each detected activity; and transmit at least a portion of the generated event data to a select number of a remainder of the plurality of monitoring modules via the network for processing thereby.

In one embodiment, the ransomware detection component may comprise an input/output interface configured to receive a plurality of configuration data associated with configuration parameters for at least one of the at least one monitoring module, the trigger rule module, the action script module, the database, and combinations thereof.

In accordance with the embodiments disclosed herein, the present disclosure may provide a system for mitigating the effects of ransomware attacks. The system may comprise a plurality of computing devices and storage devices interconnected via a network. Each storage device may be configured to store a plurality of data files in a plurality of file directories, wherein a select number of the plurality of storage devices include at least one shared file directory for storing a plurality of data files therein, wherein each shared file directory may be configured to allow access to data files stored therein to a select number of the plurality of computing devices via the network. The system may further comprise a plurality of ransomware detection components, wherein each ransomware detection component may be connected to a select number of the plurality of computing devices and storage devices via the network, wherein each ransomware detection component may be configured to detect possible ransomware attacks.

Each ransomware detection component may comprise a honeypot deployment module configured to selectively deploy a plurality of honeypot data items into a select number of the plurality of storage devices, wherein the honeypot data items comprise honeypot drives, honeypot files, and combinations thereof. In one embodiment, a select number of the plurality of deployed honeypot data items may be accessible to selected users of the system.

Each ransomware detection application may further comprise a monitoring module, wherein the monitoring module may be configured to monitor a plurality of activities executed on data files stored in a select number of the plurality of storage devices, detect activities executed on data files that conform to at least one of a predefined set of activities, and generate a plurality of event data associated with each detected activity.

Each ransomware detection component also may comprise a trigger rule module configured to determine, based on event data associated with each detected activity, whether a detected activity is indicative of a ransomware attack by a third party not authorized to execute such detected activity, and generate a plurality of event analysis data therefrom. In addition, each ransomware detection component may include an action script module configured to execute, based on a determination by the trigger rule module that a detected activity is indicative of a ransomware attack, at least one action script to mitigate access to shared data files should the detected activity be a ransomware attack. Each ransomware detection component may further include a database module configured to store at least a portion of event data associated with detected activities. Each ransomware detection component may also comprise an input/output device configured to exchange at least a portion of least one of event data associated with detected activities, event analysis data, at least one action script, status update messages, and combinations thereof with a select number of a remainder of the plurality of ransomware detection components via the network.

In one embodiment, the system may further comprise an anti-ransomware failover component connected to each of the plurality of ransomware detection components via the network. The anti-ransomware failover component may comprise a failover processor for controlling the anti-ransomware failover component; a heartbeat component operatively connected to the failover processor and operable to receive a plurality of status update communications from each of the ransomware detection components connected via the network; and a shared database connected to each of the ransomware detection components and configured to store a plurality of event data associated with detected activities, event analysis data, at least one action script, and combinations thereof received from each of the ransomware detection components.

The failover processor may be operable to generate at least one control signal for each ransomware detection component to transmit a status update message to the heartbeat component at specific intervals; receive a plurality of status update messages from the heartbeat component and generate status data for each ransomware detection component therefrom; and determine, based on at least a portion of the status data, whether a selected ransomware detection component is functioning within predetermined parameters. The failover processor may also be operable to, in response to a determination that the selected ransomware detection component is not functioning within predetermined parameters, generate at least one command to restrict ransomware detection functionality of the non-functioning ransomware detection component; and transmit at least one command to a select number of remainder of the plurality of ransomware detection components to undertake at least a portion of the ransomware detection functionality of the non-functioning ransomware detection device.

In accordance with the embodiments disclosed herein, the present disclosure may provide a method for mitigating the effects of ransomware attacks within a networked system. The system may comprise a plurality of computing devices and storage devices interconnected via a network. Each storage device may be configured to store a plurality of data files in a plurality of file directories, wherein a select number of the plurality of storage devices include at least one shared file directory for storing a plurality of data files therein, wherein each shared file directory may be configured to allow access to data files stored therein to a select number of the plurality of computing devices via the network. The system may further comprise a ransomware detection component connected to a select number of the plurality of computing devices and storage devices via the network, wherein the ransomware detection component may be configured to detect possible ransomware attacks.

The method may comprise deploying, via the honeypot deployment module, a plurality of honeypot data items into a select number of the plurality of storage devices, wherein a select number of the plurality of deployed honeypot data items are accessible to selected users of the system, wherein the honeypot data items comprise honeypot drives, honeypot files, and combinations thereof. In a preferred embodiment, at least one honeypot data item is deployed into a majority of the shared file directories.

The method may further comprise monitoring, via the monitoring module, a plurality of activities executed on data files stored in a select number of the plurality of storage devices. The method may comprise detecting, via the monitoring module, activities executed on data files that conform to at least one of a predefined set of activities, and generating a plurality of event data associated with each detected activity. In a preferred embodiment, the plurality of monitored activities may comprise activities associated with predefined file types, predefined file activities, predefined directory activities, predefined user activities, predefined processes, and combinations thereof.

The method may also comprise determining, via the trigger rule module, based on event data associated with each detected activity, whether a detected activity is indicative of a ransomware attack by a third party not authorized to execute such detected activity, and generating a plurality of event analysis data therefrom. In addition, the method may comprise executing, via the action script module, based on a determination by the trigger rule module that a detected activity is indicative of a ransomware attack, at least one action script to mitigate access to shared data files should the detected activity be a ransomware attack.

In one embodiment, the method may further comprise storing at least a portion of at least one of the plurality of event data associated with detected activities, the plurality of event analysis data, and combinations thereof in the database module.

In another embodiment, the method may include storing threshold data associated with a plurality of predetermined threshold levels with respect to selected activities executed on data files in the database module; determining, via the trigger rule module, whether an occurrence of a detected activity exceeds a predetermined threshold level associated with such activity; and based on whether the predetermined threshold is exceeded, determining, via the trigger rule module, whether the detected activity is indicative of a ransomware attack.

In yet another embodiment, at least one action script may comprise at least one security action selected from the group consisting of preventing at least one process from accessing data files stored in at least one of the plurality of storage devices; suspending at least one process executing on data files stored in at least one of the plurality of storage devices; creating a backup copy of at least a portion of data files stored in at least one of the plurality of storage devices; terminating processes on at least one of the plurality of storage devices and plurality of computing devices; generating at least one alert in response to a determination that a detected activity is indicative of a ransomware attack; restricting access to the system of at least one user associated with a detected activity that is determined to be indicative of a ransomware attack; quarantining at least one of the plurality of storage devices and plurality of computing devices on which a detected activity is executed that is determined to be indicative of a ransomware attack; and combinations thereof.

In a still further embodiment, the method may further comprise storing a plurality of action scripts associated with a plurality of detected activities executed on data files in the database module; and accessing, by the action script module, at least one action script associated with a selected detected activity and executing the at least one action script to mitigate access to shared data files should the detected activity be a ransomware attack.

In a preferred embodiment, the ransomware detection component may comprise a plurality of monitoring modules. The method may comprise monitoring, by each of the monitoring modules, a plurality of activities executed on data files stored in a select number of the plurality of storage devices; detecting, by each of the monitoring modules, activities executed on honeypot data items that conform to at least one of a predefined set of activities; and generating, by each of the monitoring modules, a plurality of event data associated with each detected activity. The method may also include transmitting, by each of the monitoring modules, at least a portion of the generated event data to a select number of a remainder of the plurality of monitoring modules via the network for processing thereby.

In another embodiment, the ransomware detection component may further comprise an input/output interface, the method further comprising receiving, via the input/output interface, a plurality of configuration data associated with configuration parameters for at least one of the monitoring module, the trigger rule module, the action script module, the database, and combinations thereof.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure As it will be realized, the present disclosure is capable of other different embodiments and its several details are capable of modifications in various obvious embodiments all without departing from, or limiting, the scope herein. Accordingly, the drawings and descriptions will be regarded as illustrative in nature and not as restrictive.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE ILLUSTRATIVE EMBODIMENTS

Figure 1:
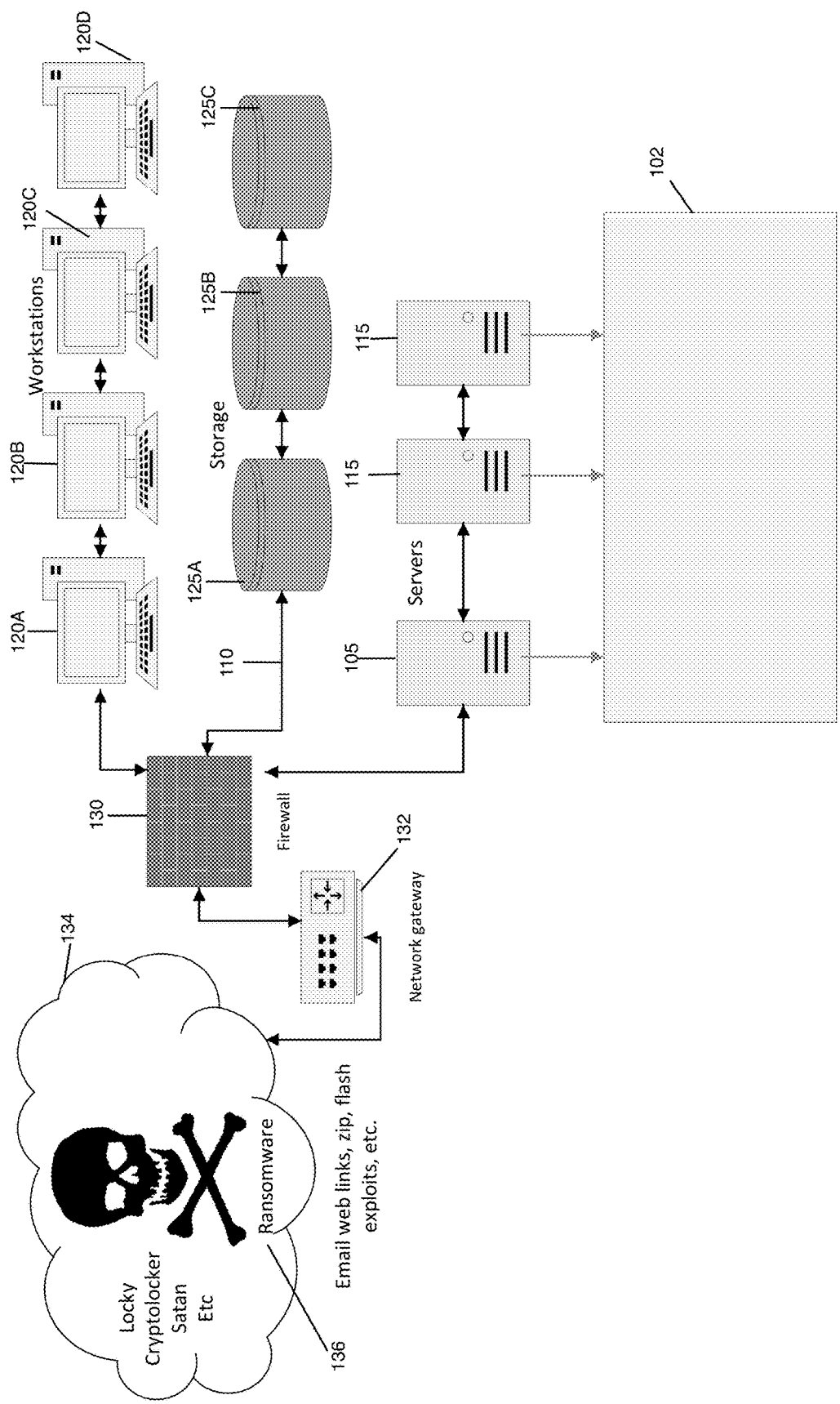
FIG. 1 is a system diagram illustrating an example embodiment of an environment in which an anti-ransomware application executes according to the present disclosure.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are signify both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware embodiments. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.001-10% from the indicated number or range of numbers.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

In various implementations, there may be provided a system and method for protecting computing systems from malicious encryption attempts or ransomware attacks. As will be explained in greater detail below, an anti-ransomware application monitors attempts to edit files, and performs security actions on attempts that are determined to be malicious, thus preventing ransomware from successfully encrypting files.

FIG. 1 is a high-level block diagram illustrating a system environment 100 for an anti-ransomware application 102. The system 100 comprises a server 105, an internal network 110, one or more storage devices shown as 115A, 115B, 115C (collectively referenced herein as storage device 115), and various client devices 120A, 120B, 120C, 120D (collectively referenced herein as client devices 120). In a preferred embodiment, the system environment 100 may also include one or more one auxiliary servers 125A, 125B (collectively referenced herein as auxiliary server 125), which are in communication with server 105. For simplicity and clarity, only server 105, two auxiliary servers 125, a limited number of storage devices 115, and a limited number of client devices 120 are shown; however, other embodiments may include different numbers of servers 105, 125, storage devices 115, and client devices 120. Furthermore, the system environment 100 may include different or additional entities.

The server 105 is a computer system configured to store, receive, and transmit data to client devices 120 via the internal network 110. The server 105 may include a singular computing system, such as a single computer, or a network of computing systems, such as a data center or a distributed computing system. In an embodiment, the server 105 is a content or data server providing information to a client device 120. For example, the server 105 may be a website server that provides web content for viewing on client devices 120. Furthermore, the server 105 may be a file server that provides files that may be downloaded by the client devices 120. The server 105 may receive requests for data from client devices 120 and respond by transmitting the requested data to the client devices 120. The server 105 is a potential source of malware that may infiltrate one or more client devices 120. For example, as a user browses websites or downloads network files, malware embedded in the website or files may become installed on a client device 120, often without the user's knowledge. The auxiliary server 125 may have the same configuration and include the same functionality as server 105.

The internal network 110 represents the communication pathways between the server 105, auxiliary server 125, storage devices 115, and client devices 120. The internal network 110 may be formed of one or more networks, such as a private network, a wide area network, or a local network. In one embodiment, the system 100 further comprises a network gateway 132, which controls the exchange of data between one or more of the system components with an external network 134, such as the Internet. The network gateway 132 provides an interface to support communication between the internal network 110 and the external network 134. For example, the internal network 100 may implement different a communication protocol, data sharing policies, security requirements, and the like than the external network 134.

In one embodiment, the network 110 uses standard communications technologies and/or protocols. Thus, the network 110 may include links using technologies such as Ethernet, Wi-Fi (802.11), integrated services digital network (ISDN), digital subscriber line (DSL), asynchronous transfer mode (ATM), etc. Similarly, the networking protocols used on the network 110 may include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), long term evolution (LTE), code division multiple access 2000 (CDMA2000), and/or wide-band CDMA (WCDMA). The data exchanged over the network 110 may be represented using technologies and/or formats including the hypertext markup language (HTML), the extensible markup language (XML), the wireless access protocol (WAP), the short message service (SMS) etc. In addition, all or some of the links may be encrypted using conventional encryption technologies such as the secure sockets layer (SSL), Secure HTTP and/or virtual private networks (VPNs). In another embodiment, the entities may use custom and/or dedicated data communications technologies instead of, or in addition to, the ones described above.

In one embodiment, the system 100 further comprises a firewall 130 positioned between the internal network 110 and the network gateway 132. The firewall 130 is suitably configured to monitor incoming and outgoing network traffic and determines whether to allow or block specific traffic based on predetermined security rules. In a preferred embodiment, the firewall 130 is configured to establish a barrier between the internal network 110 and the untrusted external network 134, and to prevent malware, such as ransomware 136, from gaining access to the internal network 110.

Each storage device 115 comprises both volatile memory (e.g., random access memory) and non-volatile storage memory such as hard disks, flash memory, flash drives, external memory storage devices, USB drives, discs and the like. In addition to storing program instructions, the storage devices 115 stores various system data associated with operation of the system 100, the anti-ransomware application 102, and other applications 132. In one embodiment, each storage device 115 may include shared data resources which may be accessible to multiple components on the system 110, such as by the server 105, an auxiliary server 125, a client device 120, or another storage device 115.

In one embodiment, the storage device 115 comprises a non-transitory computer-readable storage medium. Various executable programs (e.g., an operating system, the anti-ransomware application 102, and user applications) may be embodied as computer-executable instructions stored on one or more of the storage devices 115. The executable programs may be accessed by one or more components on the system 100. For example, one of the client devices 120 may access an executable program for a user application in order to run such program on the client device 120. Examples of user applications may include a word processor, a spreadsheet application, and a web browser. In some cases, a user application may be a source of malware that is unknowingly hidden in the user application. The malware may infect the client device 120 when the user application is installed.

Each client device 120 comprises one or more computing devices capable of processing data as well as transmitting and receiving data via a network 110. For example, a client device 120 may be a desktop computer, a laptop computer, a smart phone, a tablet computing device, an Internet of Things (IoT) device, or any other device having computing and data communication capabilities. Each client device 120 may include a processor (not shown) for manipulating and processing data, and a storage medium (not shown) for storing data and program instructions associated with various applications.

A ransomware detection component or anti-ransomware application 102 detects, stops, and removes ransomware 136. The anti-ransomware application 102 may prevent new ransomware 136 from infecting one or more components of the system 100 or remove or disable existing ransomware that is already present on the system 100. The anti-ransomware module 102 is described in further detail below.

Figure 2:
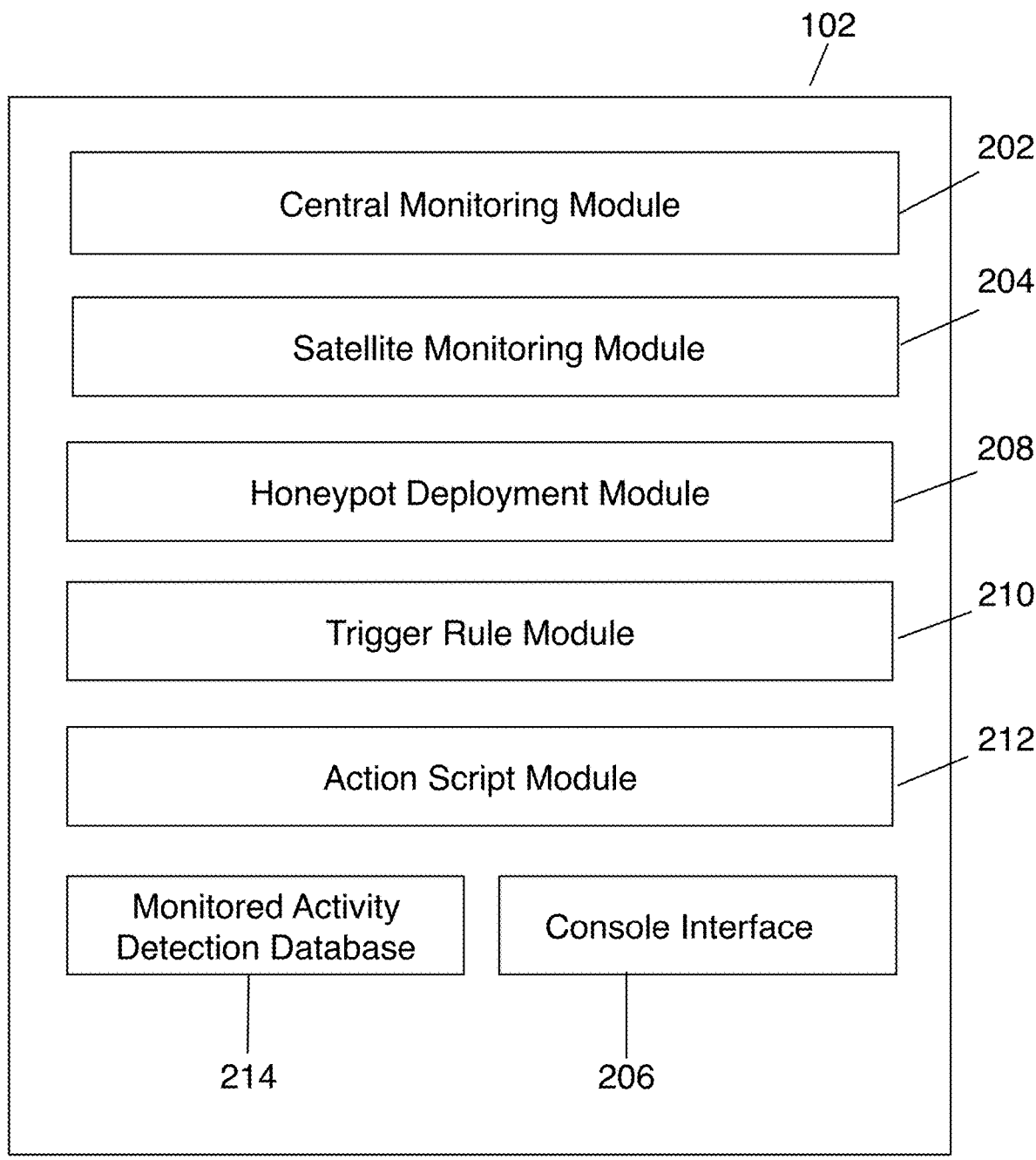
FIG. 2 is a block diagram illustrating an example embodiment of an anti-ransomware application according to the present disclosure.

FIG. 2 illustrates an example of an anti-ransomware module 102. The anti-ransomware module 102 includes a Central Monitoring Module 202, a Satellite Monitoring Module 204, a Console Interface 206, a Honeypot Deployment Module 208, a Trigger Rule Module 210, an Action Script Module 212, and an Monitored Activity Detection Database 214. Alternative embodiments may include different or additional modules or omit one or more of the illustrated modules. It is understood that the anti-ransomware module may reside on or more physical computing devices, on one or more virtual devices, and the like, as is known in the art.

The Central Monitoring Module 202 monitors activities that occur within the system 100, including, but not limited to, file accesses, network accesses, application accesses, registry accesses, file creations, file modifications, process calls, and process creations. For example, and as will be explained in greater detail below, the Central Monitoring Module 202 may detect an attempt to alter a file by the server 105, auxiliary server 115, one of the client devices 120, or any other component of the system 100. The Central Monitoring Module 202 may generate a log or report of all monitored activities, which may be stored in the Monitored Activity Detection Database 214 for further processing or analysis. The Satellite Monitoring Module 204 operates in conjunction with the Central Monitoring Module 202 to monitor activities that occur with the system 100. In a preferred embodiment, the Central Monitoring Module 202 is installed or operates on server 105, and the Satellite Monitoring Module 204 is preferably installed or operates on auxiliary server 115. In one embodiment, the Satellite Monitoring Module 204 may be installed or operate on one or more of the client devices 120. The Satellite Monitoring Module may provide additional monitoring of activities within the system 100 including, not limited to, the Central Monitoring Module 202 being unable to monitor activities for a period of time, the Central Monitoring Module 202 being unable to communicate with the auxiliary server 115, one of the client devices 120, or any other component, or with respect to different activities, triggers, and the like.

The Honeypot Deployment Module 208 deploys honeypot drives and/or honeypot files within strategic file directories within the system 100. As used herein, "honeypot" refers to any object on a network or computing device that is used to detect, deflect, or counteract attempts to gain unauthorized access to a computing device or computing system by an attacker. The honeypot includes data that appears to be legitimate, but is actually isolated and/or monitored by an entity on the computing device or computing system. The honeypot data seemingly contains information of value to the attacker, and is used to bait access by a process run by or created by a malicious program, such as a ransomware program. A "honeypot file" refers to a file containing honeypot data. A "honeypot drive" refers to shared data resource comprised of folders and files containing honeypot data.

The Honeypot Deployment Module 208 creates and strategically deploys honeypot drives and/or honeypot files in one or more shared resources resident on at least one of the server 105, the auxiliary server 115, one or more of the client devices 120, one or more of the storage devices 125 and combinations thereof. In a preferred embodiment, the Honeypot Deployment Module 208 deploys honeypot drives within a majority of the valid shared resources. In a more preferred embodiment, the Honeypot Deployment Module 208 deploys honeypot drives surrounding each valid shared resource. As an exemplary system configuration, Accounting Data is shared resource stored on one of the storage devices 125 on the I Drive and Client data is a shared resource stored on the K Drive. I. In this exemplary system configuration, in a more preferred embodiment, the Honeypot Deployment Module 208 would strategically deploy one honeypot drive as a shared resource stored on the H Drive, a second honeypot drive as a shared resource stored on the J Drive, and a third honeypot drive as a shared resource stored on the L Drive. As such, the valid shared resources, Accounting Data and Client Data would be surrounded by honeypot drives containing honeypot data.

In a preferred embodiment, at least a portion of the honeypot drives and honeypot files deployed on the system 100 may be visible and accessible by a user thereof. In a preferred embodiment, the user will have the ability to read and to write to at least a portion of the deployed honeypot drives and honeypot files.

In a preferred embodiment, the Central Monitoring Module 202 and the Satellite Monitoring Module 204 monitor selected activities performed with respect to one or more of the deployed honeypot drives and/or honeypot files.

The honeypot drives and honeypot files include properties and/or attributes which increase or optimize the probability of a honeypot data being the first data accessed by a ransomware process upon execution of ransomware process on an affected component of the system 100. In one embodiment, honeypot drives and honeypot files may be named according to a strategic naming convention which increases the probability of honeypot data being accessed by a ransomware process.

The Trigger Rule Module 210 analyzes at least a portion of activities monitored by the Central Monitoring Module 202 and the Satellite Monitoring Module 204, particularly those activities with respect to one or more of the deployed honeypot drives and/or honeypot files. The Trigger Rule Module 210 may also determine, based on the analysis, that one or more of the monitored activities represents a possible ransomware attack. The Action Script Module 214, in response to the determination by the Trigger Rule Module 210 that one or more of the detected monitored activities represents a possible ransomware attack, may perform a security action in response thereto.

The Console Interface 206 provides a user interface for the user or administrator of the system to configure and/or access at least one of the Central Monitoring Module 202, the Satellite Monitoring Module 204, the Honeypot Deployment Module 208, the Trigger Rule Module 210, the Action Script Module 212, and the Monitored Activity Detection Database 214. The Monitored Activity Detection Database 214 stores event data associated with monitored activities detected by the Central Monitoring Module 202 and the Satellite Monitoring Module 204, particularly those activities with respect to one or more of the deployed honeypot drives and/or honeypot files. In a preferred embodiment, the Monitored Activity Detection Database 214 is a SQL database.

Figure 3:
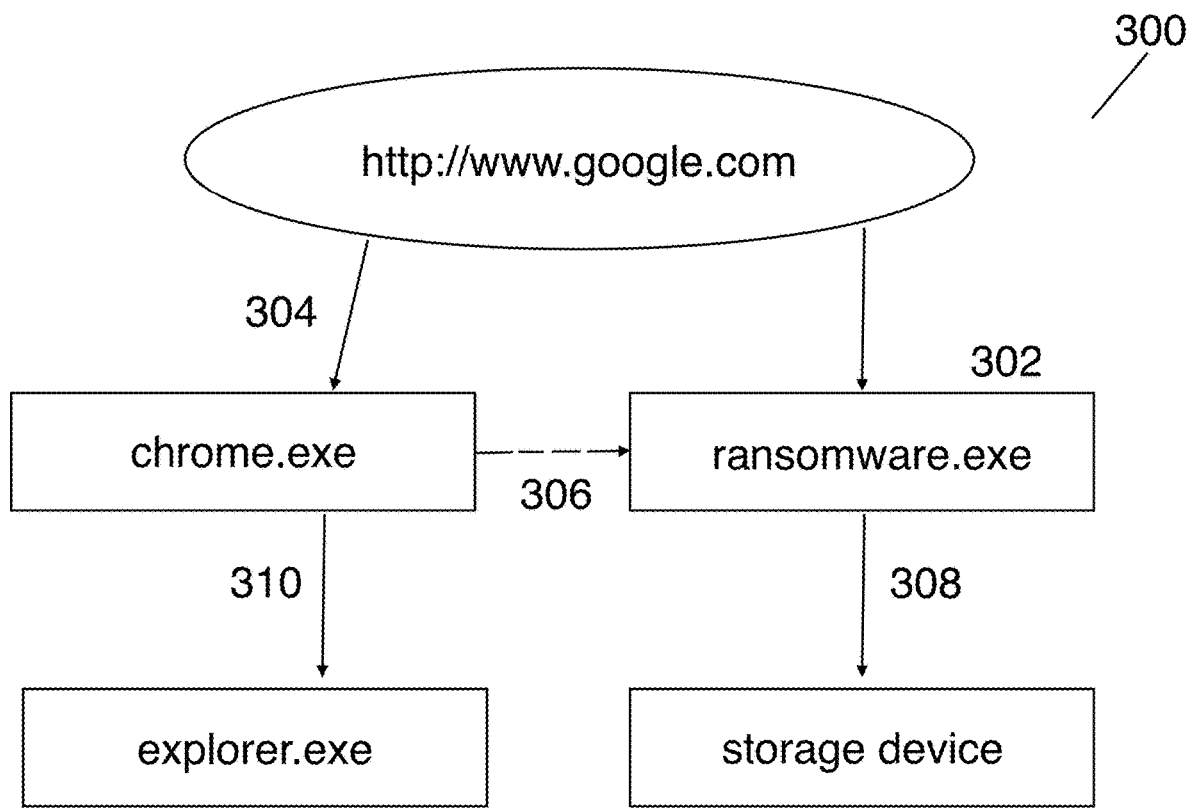
FIG. 3 is a diagram of an example of a ransomware attack.

To better understand the operation of the components of the anti-ransomware application 102, and the process for protecting the system 100 from malicious encryption attempts or ransomware attacks, an example of a network-based ransomware attack 300 as carried out on a client device 120 is illustrated in FIG. 3. In the example ransomware attack 300, a malicious process instance of ransomware enters the client device 120 as a file ransomware.exe via a download 302 from a website, for example, www.google.com, accessed 304 though a web browser via the process chrome.exe. As a result, the process chrome.exe causes the creation 306 of the ransomware.exe executable file (and the execution of the process ransomware.exe). It is noted that the process chrome.exe is executed 310 by the Windows® OS process explorer.exe. Although not shown in the drawings, the malicious process may be initially executed by a file (i.e., malicious file) that was extracted from a compressed file, such as, for example, a zip file, a rar file, or the like, downloaded from the web site.

The execution of the process ransomware.exe causes the restriction (e.g., encryption) 308 of files stored in a storage medium, such as a storage device 125 resident on the system 100, resulting in a demand for payment of the ransom in exchange for the decryption of the files to enable the client device 120 to regain access to the files.

Note, that alternatively, a ransomware attack may be initiated on the client device 120 by the client device 120 accessing a web site or Internet address (i.e., a malicious web site or Internet address), via a URL, IP address or the like. Also note, that non-network based ransomware attacks may be carried out via the execution of a ransomware executable file stored on an external device connectable to one of the system components, such as, for example, a USB connection or the like.

Also note that ransomware processes typically access the files of the client device 120 (or server 105 or storage device 125) in a file directory by iterating according to order and sorting settings programmed into the ransomware code by the ransomware creator. For example, the order and sorting settings of the ransomware code may allow the ransomware to iterate files in a file directory according to alphabetical order, alphanumeric order, file creation timestamp, file modification timestamp, or combination thereof. Once a specific file is accessed by the ransomware process, the ransomware performs operations to restrict access to the file, such as, for example, encrypting the file. Multiple file directories and sub-directories can be iterated in parallel, allowing the ransomware process to restrict access to multiple files simultaneously.

Figure 4:
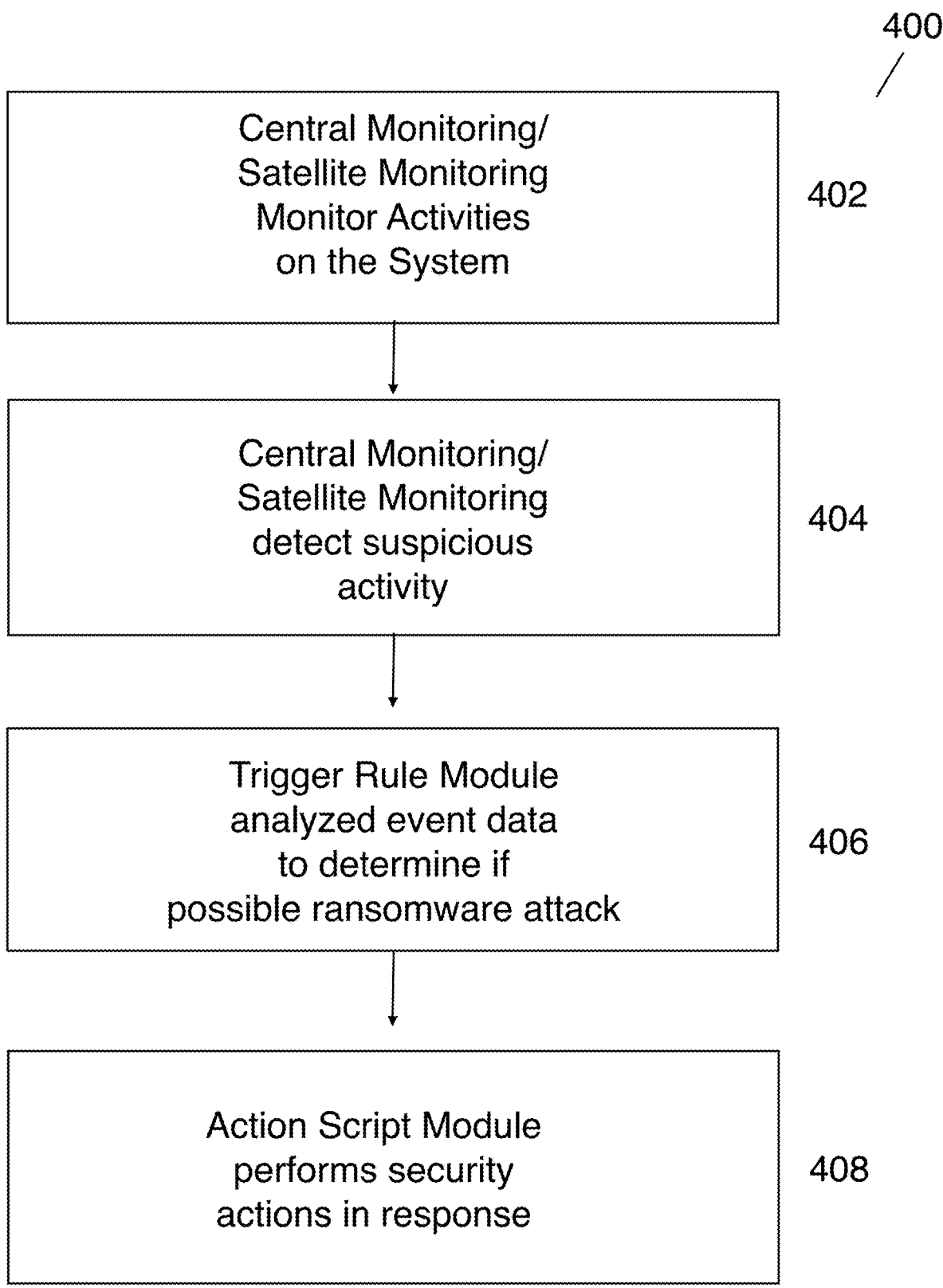
FIG. 4 is flow diagram of an exemplary method for protecting a computing system from a ransomware attack according to the present disclosure.

FIG. 4 is a high-level flow diagram for an exemplary method 400 for protecting the system 100 and its files from ransomware attacks. At step 402, the Central Monitoring Module 202 and/or the Satellite Monitoring Module 204 monitor activities that occur within the system 100, including, but not limited to, file accesses, network accesses, application accesses, registry accesses, file creations, file modifications, process calls, and process creations. In a preferred embodiment, the Central Monitoring Module 202 and the Satellite Monitoring Module 204 may be configured to monitor or watch activities pertaining to selected file types, selected file activities, selected directory activities, selected user activities, selected streams and behaviors, and the like, and combinations thereof. In another embodiment, the Central Monitoring Module 202 and the Satellite Monitoring Module 204 may be configured to ignore or disregard activities with respect to selected file types, selected files, selected subdirectories, selected user, selected processes, and the like, and combinations thereof. The system user or administrator may configure the Central Monitoring Module 202 and the Satellite Monitoring Module 204 via the console interface 206 to monitor activities in any suitable manner as desired to protect the system 100 from ransomware attacks.

FIGS. 5A-5D illustrate an exemplary user interface 500 of the console interface 206 for configuring the Central Monitoring Module 202. At 502, the user selects which servers and/or devices on the system 100 to monitor. The user may suitably select any combination of servers and/or devices to monitor. In addition, the user may configure the activities to be monitored for each selected server or device independently, such that the activities to be monitored may differ between the selected servers and devices. As shown in FIGS. 5A-5D at 502, the user has selected server DC3 to configure. Thus, in this example, the configuration shown in FIGS. 5A-5D will only apply to server DC3 and the files stored on server DC3 and shared with server DC3.

At 504, the user selects at least one directory associated with server DC3 to be monitored. As shown in this example, the user has selected directory C:\100gb\ to be monitored. The user may also select, as shown at 506, whether any subdirectories associated with C:\100gb\ be monitored. The user may also select, as shown at 508, whether the Action Script Module 212 should implement security actions for suspected ransomware events identified by the Trigger Rule Module 210 for each suspected ransomware event separately. Further, the user may select, as shown at 510, whether suspected ransomware events should be recorded or stored in the Monitored Activity Detection Database 214.

In one embodiment, the user may then configure the Central Monitoring Module 202 to monitor or watch selected activities occurring within the system 100. As shown in FIGS. 5A-5D, at 512, the user is provided with a listing of categories for which monitoring of activities may be configured therefore. As shown in this example, the user may configure monitoring of activities with respect to selected file types 514, selected file activities 516, selected directory activities 518, selected user activities 520, and selected streams and behaviors 522. Alternative embodiments may include different or additional categories or omit one or more of the illustrated categories.

Figure 5A:
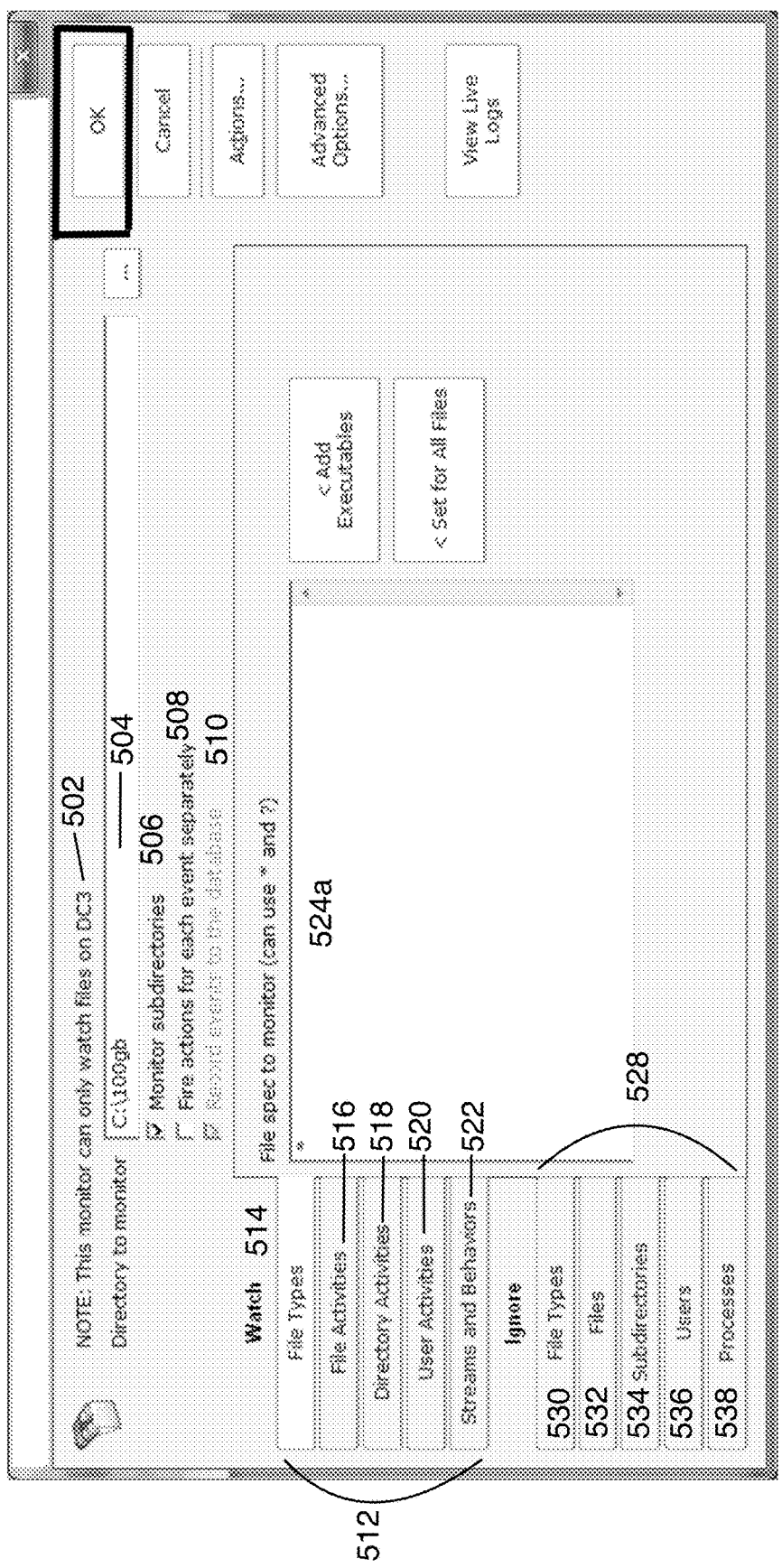
FIGS. 5A-5D illustrate example user interfaces for customizing the Central Monitoring Module according to the present disclosure.

As shown in FIGS. 5A-5D, the user may then determine which activities should be monitored with respect to the selected category. As illustrated in FIG. 5A, as shown at 524a, the user may provide a listing of one or more file types for which activities with respect thereto should be monitored. Examples of file types which may be monitored include, but are not limited to: executable files, selected types of data files, selected types of application files, and the like. In a preferred embodiment, the file types suitably include one or more file types associated with the deployed honeypot drives and/or honeypot files.

Figure 5B:
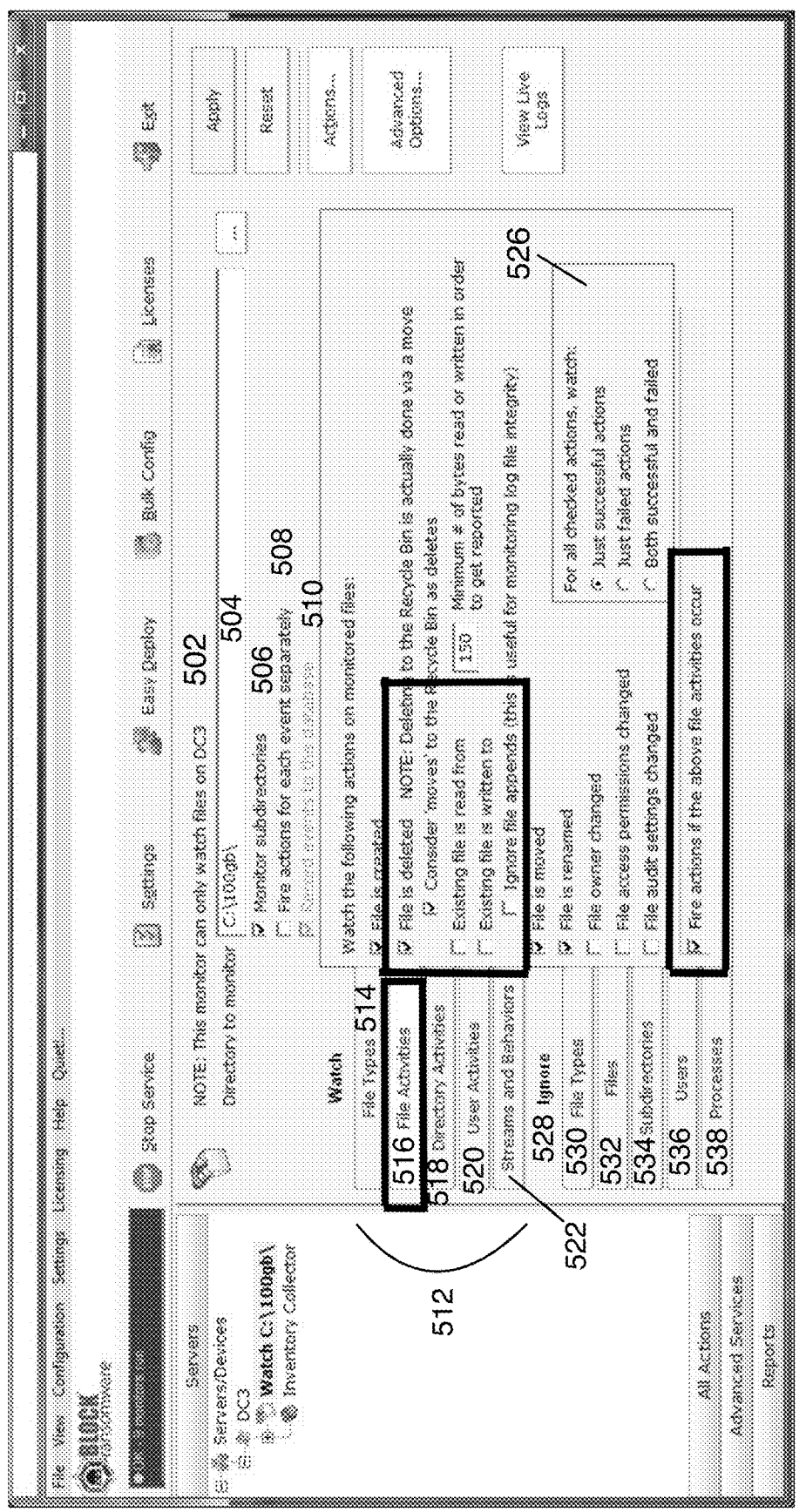

In FIG. 5B, as shown at 524b, the user may select which file activities should be monitored. Examples of file activities which may be monitored include, but are not limited to: a file is created, a file is deleted, an existing file is read from, an existing file is written to, a file is moved, a file is renamed, a file owner is changed, a file access permission is changed, a file audit access is changed, and the like. As illustrated in this example, the user has selected certain activities to be monitored with respect to selected files contained in the C:\100gb\ directory. In this example, the Central Monitoring Module 202 will monitor the following activities: a file is created, a file is deleted, a file is moved, and a file is renamed.

In one embodiment, as shown in FIG. 5B, at 526, the user may select whether the Central Monitoring Module 202 monitors only successful actions for selected file activities, monitors only failed actions for selected file activities, or monitors both successful and failed actions. As shown in this example, the Central Monitoring Module 202 will only watch for successful actions from the list of selected file activities.

Figure 5C:
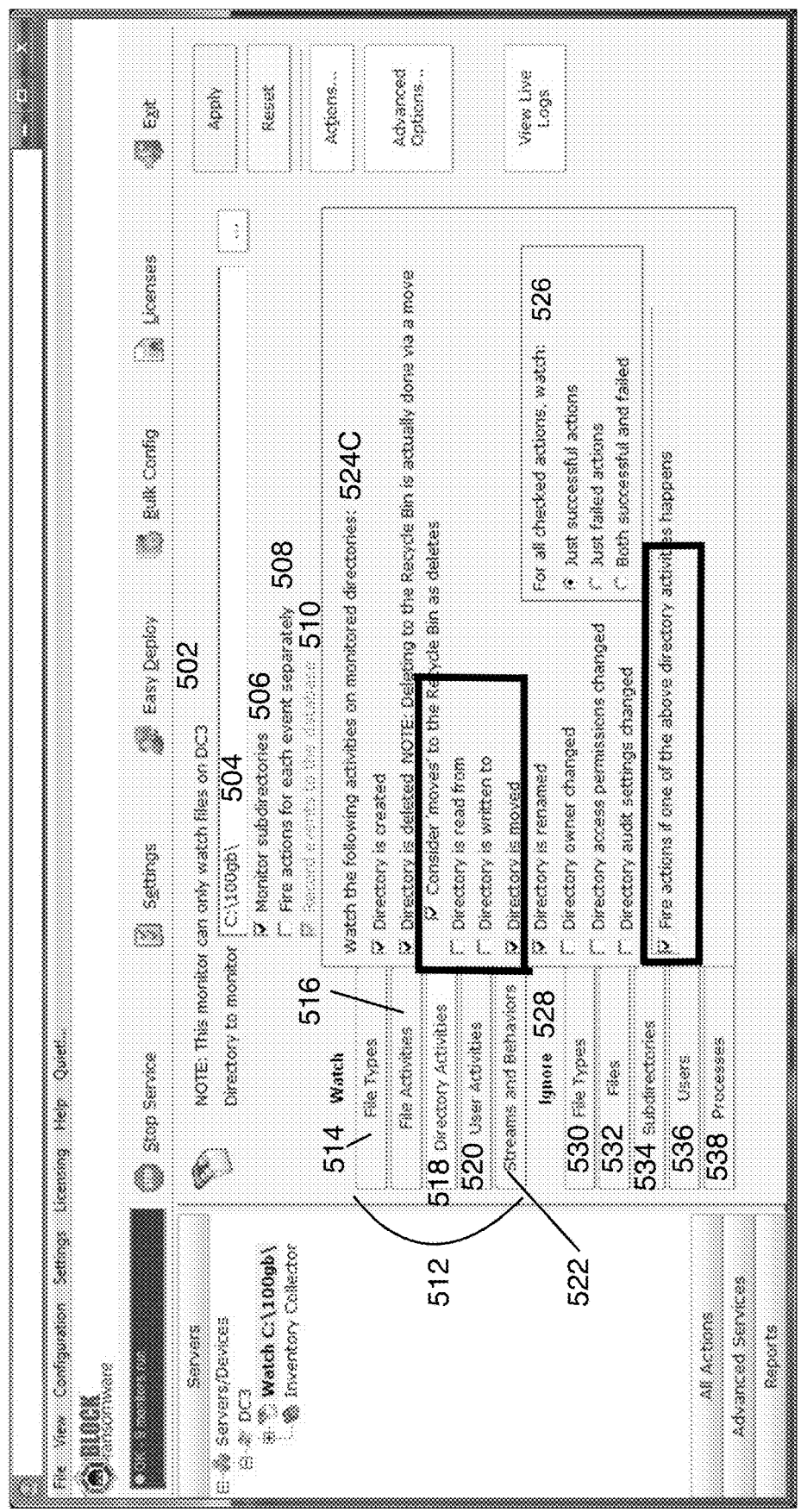

In FIG. 5C, as shown at 524c, the user may select which directory activities should be monitored. Examples of directory activities which may be monitored include, but are not limited to: a directory is created, a directory is deleted, a directory is read from, a directory is written to, a directory is moved, a directory is renamed, a directory owner is changed, a directory access permission is changed, a directory audit access is changed, and the like. As illustrated in this example, the user has selected certain activities to be monitored with respect to selected files contained in the C:\100gb\ directory. In this example, the Central Monitoring Module 202 will monitor the following activities: a directory is created, a directory is deleted, a directory is moved, and a directory is renamed.

In one embodiment, as shown in FIG. 5C, at 526, the user may select whether the Central Monitoring Module 202 monitors only successful actions for selected directory activities, monitors only failed actions for selected directory activities, or monitors both successful and failed actions. As shown in this example, the Central Monitoring Module 202 will only watch for successful actions from the list of selected directory activities.

Figure 5D:
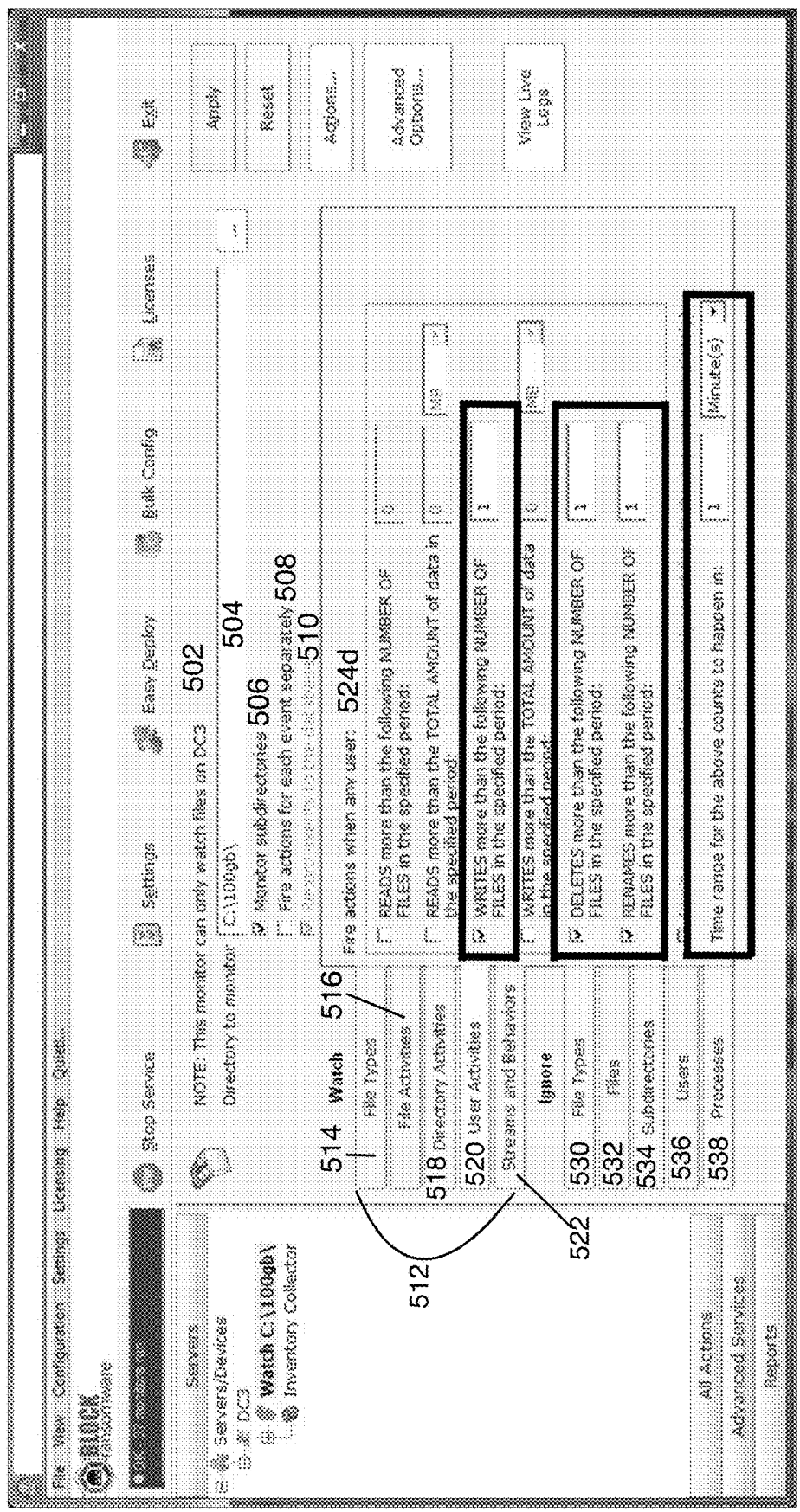

In FIG. 5D, as shown at 524d, the user may select which user activities should be monitored. Examples of user activities which may be monitored include, but are not limited to: a user reads more than a defined number of files in a specified period, a user reads more than a defined total amount of data in the specified period, the user writes more than a defined number of files in a specified period, the user writes more than a defined total amount of files in a specified period, a user deletes more than a defined number of files in a specified period, the user renames more than a defined number of files in a specified period, and the like. As illustrated in this example, the user has selected certain activities to be monitored with respect to selected files contained in the C:\100gb\ directory. In this example, the Central Monitoring Module 202 will monitor the following activities: a user writes to more than 1 file in a 1-minute period, a user deletes more than 1 file in a 1-minute period, and a user renames more than 1 file in a 1-minute period.

In the example shown in FIG. 5D, the configured thresholds for the selected user activities may be used by the Trigger Rule Module 210 to determine whether the detected activity may represent a ransomware attack. For example, if a user writes to three separate word documents located in directory C:\100gb\ within a 1-minute time period, the Central Monitoring Module 202 will detect such activity and record the activity in the Monitored Activity Detection Database 214. In addition, the threshold for the number of permitted activities will be exceeded, and the Trigger Rule Module 210 will use the event data to determine whether the Action Script Module 212 should implement security actions in response thereto.

In another embodiment, the user may select which user activities should be monitored. In this embodiment, the user may configure the user activity thresholds differently for monitored activities with respect to deployed honeypot drives and/or honeypot files than for monitored activities for valid shared resources. For example, the user may configure the Central Monitoring Module 202 to monitor the following activities: a user writes to more than 1 honeypot file in a 1-minute period, a user deletes more than 1 honeypot file in a 1-minute period, and a user renames more than 1 honeypot file in a 1-minute period. In addition, the user may further configure the Central Monitoring Module 202 to monitor the following activities: a user writes to more than 2 system files in a 1-minute period, a user deletes more than 2 system files in a 1-minute period, and a user renames more than 2 system files in a 1-minute period.

In this embodiment, if a user writes to a single word document located in located in directory C:\100gb\ within a 1-minute time period, and the word document is a deployed honeypot file, the Central Monitoring Module 202 will again detect such activity and record the activity in the Monitored Activity Detection Database 214. As with the previous example, the threshold for the number of permitted activities will be exceeded, and the Trigger Rule Module 208 will use the event data to determine whether the Action Script Module 212 should implement security actions in response thereto. As shown in this example, activities with respect to deployed honeypot drives and honeypot files may be more strictly monitored. In addition, the the event data associated with a detected monitored activity may be more stringently analyzed by the Trigger Rule Module 210.

In one embodiment, the user may also configure the Central Monitoring Module 202 to ignore selected activities occurring within the system 100. As shown in FIGS. 5A-5D, at 528, the user is provided with a listing of categories for which certain activities should be ignored or not monitored. As shown in this example, the user may configure the Central Monitoring Module 202 to ignore activities with respect to selected file types 530, selected files 532, selected subdirectories 534, selected users 536, and selected processes 538. Alternative embodiments may include different or additional categories or omit one or more of the illustrated categories.

The user may configure the Central Monitoring Module 202 to ignore activities with respect to selected file types 528, selected files 532, selected subdirectories 534, selected users 536, and selected processes 538 in the same manner as described with respect to selecting which file activities should be monitored. Examples of file types which may be ignored include, but are not limited to: executable files, selected types of data files, selected types of application files, and the like. Examples of files which may be ignored include, but are not limited to: selected types of data files, selected types of application files, and the like. Examples of subdirectories which may be ignored include, but are not limited to: subdirectories that do not include shared data files, subdirectories that do not include deployed honeypot data items, and the like. Examples of users which may be ignored include, but are not limited to: system administers, users associated with implementing the anti-ransomware application, users with restricted access to shared data files, and the like. Examples of processes which may be ignored include, but are not limited to: executable programs, dynamic link library processes, and the like.

The Satellite Monitoring Module 204 operates in conjunction with the Central Monitoring Module 202 to monitor activities that occur with the system 100. In a preferred embodiment, the Satellite Monitoring Module 204 is installed or operates on auxiliary server 115. In one embodiment, the Satellite Monitoring Module 204 may be installed or operate on one or more of the client devices 120. The Satellite Monitoring Module may provide additional monitoring of activities within the system 100 including, not limited to, the Central Monitoring Module 202 being unable to monitor activities for a period of time, the Central Monitoring Module 202 being unable to communicate with the auxiliary server 115, one of the client devices 120, or any other component, or with respect to different activities, triggers, and the like.

Figure 6:
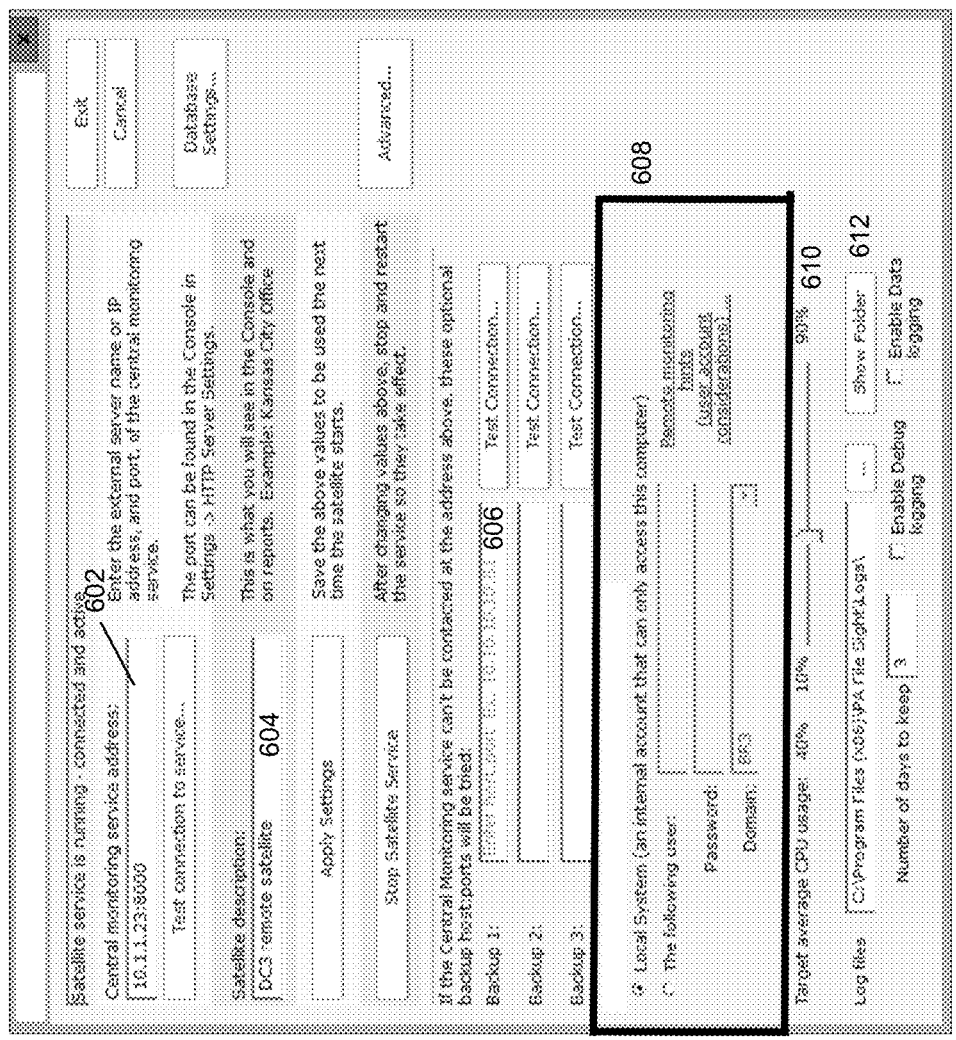
FIG. 6 is an example user interface for customizing the Satellite Monitoring Module according to the present disclosure.

FIG. 6 illustrates an exemplary user interface 600 of the Console Interface 206 for configuring the Satellite Monitoring Module 204 to operate on the auxiliary server 115, one of more of the client devices 120, and combinations thereof. In a preferred embodiment, the Satellite Monitoring Module 204 operates in conjunction with the Central Monitoring Module 202. In one embodiment, the Satellite Monitoring Module 204 communicates with the Central Monitoring Module 202 to implement the monitoring activities according to the configuration of the Central Monitoring Module 202. In another embodiment, the Satellite Monitoring Module 204 may be configured to monitor different activities with respect to each system component on which it operates. As an example, the Satellite Monitoring Module 204 installed on the auxiliary server 115 may monitor one set of activities with respect to the auxiliary server 115 and the Satellite Monitoring Module 204 installed on client device 120 may monitor a second set of activities with respect to client device 120.

As shown in FIG. 6, at 602 the user provides the address of the Central Monitoring Module 202 to which the Satellite Monitoring Module 204 will communicate. This will allow the Central Monitoring Module 202 to provide control over the monitoring activities of the Satellite Monitoring Module 204. In addition, the Satellite Monitoring Module 204 may provide data with respect to monitored activities to the Central Monitoring Module 202 to be recorded or stored in the Monitored Activity Detection Database 214 as further described below. As shown at 604, the user may provide a description of the satellite or component on which the Satellite Monitoring Module 204 is installed for ease of reference in the Console Interface 206 and in any data or reports with respect to such satellite. As shown in the example, the satellite description is provided as the DC3 remote satellite.

In the event the Central Monitoring Module 202 is unable to communicate with the Satellite Monitoring Module 204 installed on the DC3 remote satellite for a period of time, the Satellite Monitoring Module 204 may communicate with a backup server on which a backup of the Central Monitoring Module 202 is installed. This allows for the Satellite Monitoring Module 204 to continue to monitor activities in the event the Central Monitoring Module 202 goes offline for a period of time, is unable to exchange data with the Satellite Monitoring Module 204 for a period of time, or any other reason the Central Monitoring Module 202 may be unable to provide monitoring functionality or support to the Satellite Monitoring Module 202. For example, if the Central Monitoring Module 202 is subject to a ransomware attack and must be taken offline to mitigate the effects of the ransomware, the Satellite Monitoring Module 204 may continue to monitor activities. As shown at 606, the user may provide one or more addresses of backup servers to which the Satellite Monitoring Module 204 may communicate with respect to monitoring activities by the Satellite Monitoring Module 204.

In one embodiment, the Satellite Monitoring Module 204 may be configured to operate locally on the system component on which it is installed. In another embodiment, the Satellite Monitoring Module 204 may be configured to operate remotely from the system component on which it is to monitor activity. For example, the Satellite Monitoring Module 204 may be installed on the auxiliary server 115 and monitor activities remotely for client device 120 via the network 110. As shown in FIG. 6, at 608, the user may configure whether the Satellite Monitoring Module 204 operates locally or remotely.

At 610, the user may select the desired average usage of the CPU with respect to operation of the Satellite Monitoring Service 204. At 612, the user may configure the parameters for storing data associated with monitored activities in the Monitored Activity Detection Database 214.

Returning to FIG. 4, at step 402, the Central Monitoring Module 202 and/or the Satellite Monitoring Module 204 monitor selected activities that occur within the system 100 as configured by the user or system administrator. In one embodiment, the Central Monitoring Module 202 and/or the Satellite Monitoring Module 204 may generate a log or report of all monitored activities, which may be stored in the Monitored Activity Detection Database 214 for further processing or analysis.

At step 404, the Central Monitoring Module 202 and/or the Satellite Monitoring Module 204 may detect a suspicious activity on the server 105, auxiliary server 115, one of the client devices 120, or any other component of the system 100. An example of such a suspicious activity may be an attempt to alter a file stored on the server 105, auxiliary server 115, one of the client devices 120, or any other component of the system 100. The term "attempt to alter a file" as used herein, generally refers to any action or series of actions that may result in the contents, headers, and/or metadata of a file being changed. Examples of an attempt to alter a file may include, but are not limited to, moving a file, renaming a file, encrypting a file, changing the format of a file, editing a file, or deleting a file.

As described in detail with respect to FIGS. 5A-5D, the user may configure the Central Monitoring Module 202 to monitor or watch selected activities occurring within the system 100. The Central Monitoring Module 202 suitably monitors activities in accordance with the configurations selected by the user. For example, as shown in FIGS. 5A-5D, the Central Monitoring Module 202 was configured monitor activities with respect to files contained in directory C:\100gb\. In the example shown in FIG. 5B, the Central Monitoring Module 202 was configured to monitor selected file activities with respect to files contained in directory C:\100gb\. In addition, as shown in FIG. 5B, the Central Monitoring Module 202 will monitor when a file is created, when a file is deleted, when a file is moved, and when a file is renamed. Should any of those monitored activities occur on a file contained in directory C:\100gb\, the Central Monitoring Module 202 will detect the occurrence thereof. The Central Monitoring Module 202 may generate event data associated with the occurrence of the monitored activity, wherein the event data may be stored in the Monitored Activity Detection Database 214.

As described in detail with respect to FIG. 6, the user may also configure the Satellite Monitoring Module 204 to monitor or watch selected activities occurring within the system 100. The Satellite Monitoring Module 204 may be configured to implement the monitoring activities according to the configuration of the Central Monitoring Module 202 or the Satellite Monitoring Module 204 may be configured to monitor different activities with respect to each system component on which it operates. In any event, the Satellite Monitoring Module 204 suitably monitors activities in accordance with the configurations selected by the user. Should the Satellite Monitoring Module 204 detect the occurrence of a monitored activity, the Satellite Monitoring Module 204 may generate event data associated with occurrence of the monitored activity. The event data may be transmitted to the Central Monitoring Module 202 and/or the Monitored Activity Detection Database 214 for storage therein.

At step 406, the Trigger Rule Module 210 receives event data associated with one or more monitored activities detected by at least one of the Central Monitoring Module 202 and the Satellite Monitoring Module 204. The Trigger Rule Module 210 analyzes at least a portion of event data generated by the Central Monitoring Module 202 and/or the Satellite Monitoring Module 204 and may determine whether the detected monitored activity may represent a ransomware attack. In one embodiment, the Trigger Rule Module 210 analyzes the event data with respect to defined threshold parameters for the monitored activity to which the event data relates.

In one embodiment, the user may configure the activities to be monitored by the Central Monitoring Module 202 and/or the Satellite Monitoring Module 204 with specific threshold parameters for different system components, different user types or levels, different monitored activity types, different file types, and the like. As discussed above, FIGS. 5A-5D illustrate an exemplary user interfaces 500 of the Console Interface 206 for configuring the activities to be monitored. For example, the threshold parameters for monitored activities undertaken by a system administrator with unrestricted access to the system 100 may be more regulated than the threshold parameters for a with limited access. As another example, the threshold parameters for monitored activities performed on the server 105 may be more rigorous than the threshold parameters for monitored activities performed on one of the client devices 120.

In one embodiment, the user may configure the user activity thresholds differently for monitored activities with respect to deployed honeypot drives and honeypot files than for monitored activities for valid shared resources. For example, the user may configure the Central Monitoring Module 202 to monitor the following activities: a user writes to more than 1 honeypot file in a 1-minute period, a user deletes more than 1 honeypot file in a 1-minute period, and a user renames more than 1 honeypot file in a 1-minute period. In addition, the user may further configure the Central Monitoring Module 202 to monitor the following activities: a user writes to more than 2 system files in a 1-minute period, a user deletes more than 2 system files in a 1-minute period, and a user renames more than 2 system files in a 1-minute period. In this embodiment, activities with respect to deployed honeypot drives and honeypot files may be more rigorously monitored. In addition, the event data associated with a detected monitored activity may be more stringently analyzed by the Trigger Rule Module 210.

At step 408, in response to the determination by the Trigger Rule Module 210 that one or more of the detected monitored activities represents a possible ransomware attack, the Action Script Module 212 may perform one or more security actions in response thereto. In one embodiment, the user may configure the Action Script Module to invoke Action Scripts to perform any number of security actions in response to a possible ransomware attack.

Figure 7:
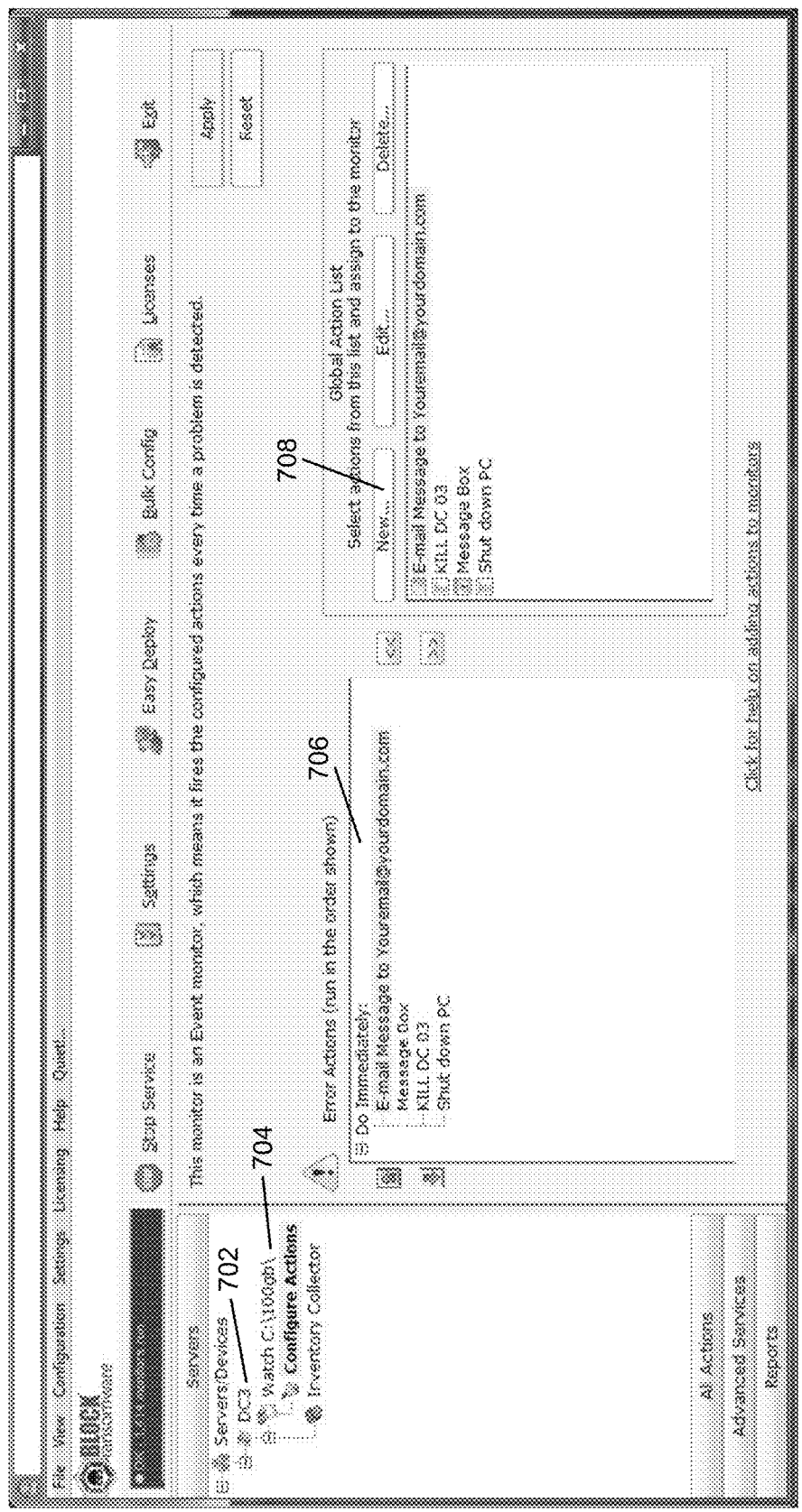
FIG. 7 is an example user interface for customizing the Action Script Module according to the present disclosure.

FIG. 7 illustrates an exemplary user interface 700 of the Console Interface 206 for configuring the Action Script Module 212 to perform security actions in response to a determination that one or more detected monitored activities represents a possible ransomware attack. At 702, the user selects which servers and/or devices on the system 100 for which Action Scripts should be configured. The user may suitably select any combination of servers and/or devices for which Action Scripts should be created. In addition, the user may configure the Action Script Module 212 such that different Action Scripts are invoked for each selected server or device independently, such that the security action responses may differ between the selected servers and devices. As shown in FIG. 7 at 702, the user has selected server DC3 for which to configure Action Scripts. Thus, in this example, the configuration shown in FIG. 7 will only apply to server DC3 and the files stored on server DC3 and shared with server DC3.

At 704, the user selects at least one directory associated with server DC3 for which Action Scripts should be configured. As shown in this example, the user has selected directory C:\100gb\.

At 706, the user may provide the parameters for at least one Action Script to be invoked in response to a determination by the Trigger Rule Module 210 that one or more of the detected monitored activities represents a possible ransomware attack. In one embodiment, a plurality of Action Scripts may be configured to correspond to a variety of possible ransomware attacks. For example, if the possible ransomware attack is detected with respect a single client device 120, then the Action Script may only involve security actions with respect to the affected client device 120. If the possible ransomware attack is determined to be more invasive and involve multiple system components, then the corresponding Action Script may be much more detailed and require more resources.

In one embodiment, at 708, the user may select one or more actions to incorporate into an Action Script from a list of global actions. The global actions include, but are not limited to, standard actions provided with ransomware application, actions specifically configured for the system parameters, actions specifically configured for certain ransomware attacks or activities, and the like. In some embodiments, an Action Script may include cautionary security responses, including, but not limited to: preventing a new process from accessing files in the same directory as the honeypot file to which an access request was made; suspending a new process; creating a backup copy of at least a portion of the files that are in same directory or subdirectory of the honeypot file to which an access request was made; and blocking the execution of a file deletion operation to prevent the deletion of some or all of the files that are in the same directory or subdirectory of the honeypot file to which the access request was made. In another embodiment, an Action Script may include protective security responses, including, but not limited to: preventing a new process from accessing other files stored within the affected component or system; stopping a new process; generating an alert to at least one of the system administrator or user; suspending the administrative account of user associated with the detected monitored activity; and quarantining the affected component.

Figure 8:
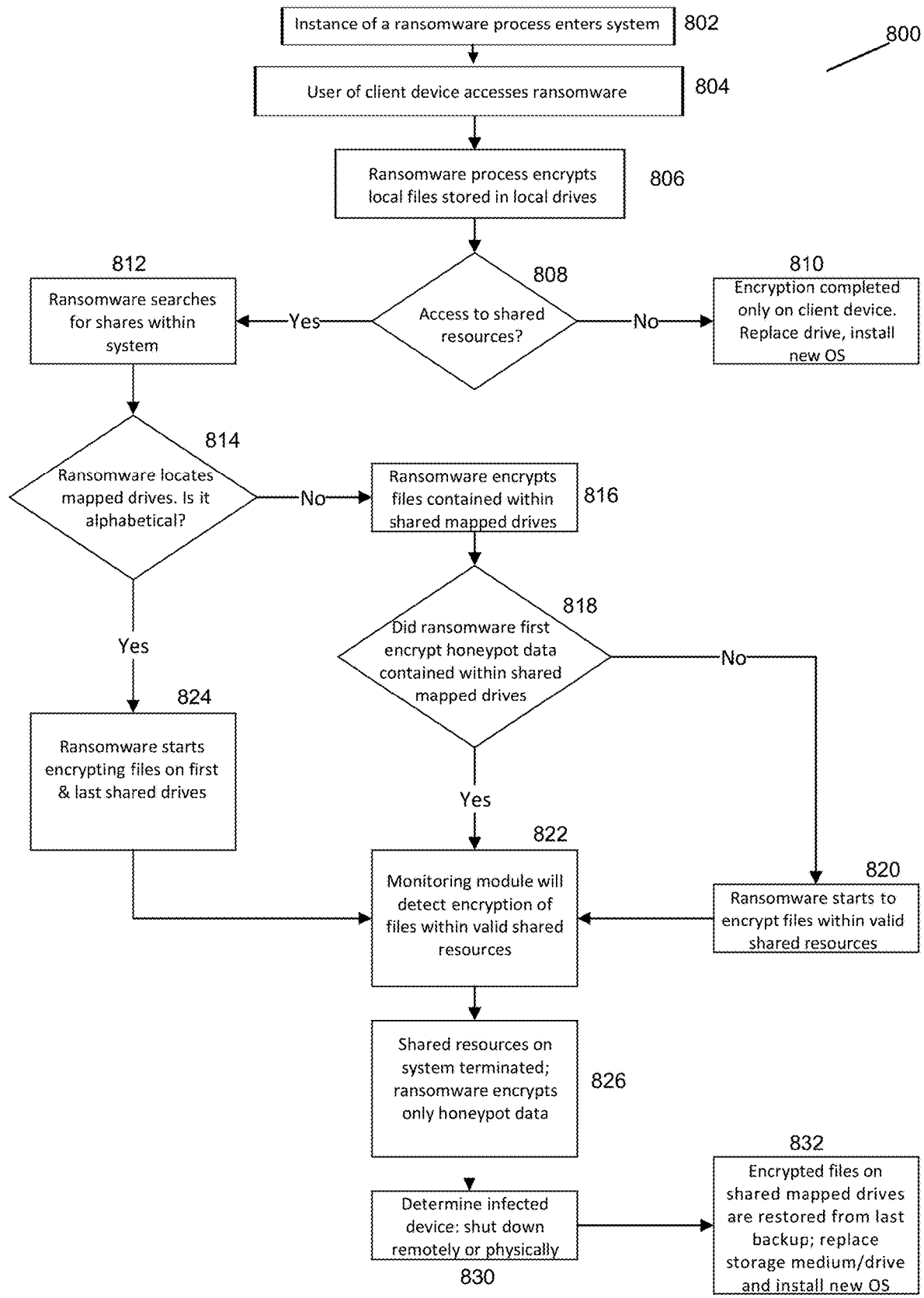
FIG. 8 is a flow diagram of one embodiment of a method for protecting a computing system from ransomware according to the present disclosure.

FIG. 8 is a flow diagram of one embodiment of a method 800 for protecting a computing system from ransomware attack according to the present disclosure. At 802, an instance of a ransomware process enters the system 100. The ransomware process may enter the system 100 by any suitable means. Examples of a ransomware process entering the system include, but are not limited to: being downloaded from a website accessed through a web browser by one of the client devices 120; by one of the client devices 120 accessing a web site or Internet address, via URL, IP address, or the like; via execution of a ransomware executable file stored on an external device and connected to one of the components of the system 100, and the like.

At 804, a user of one of the client devices 120 access the ransomware starting the ransomware process on the client device 120. At 806, the ransomware process has started to encrypt the local files stored in local drives on the infected client device 120.

At 808, the ransomware process determines if the infected client device 120 has access to any shared resources on the system 100. If the ransomware process determines that the infected client device 120 does not have access to shared resources, then the method proceeds to 810, wherein the ransomware process has only encrypted files stored on the infected client device 120. The storage medium or drive for the infected client device 120 is replaced and a new operating system is installed.

If the ransomware process determines that the infected client device 120 does have access to shared resources, then the method proceeds to 812, wherein the ransomware process searches for shared resources within the system 100.

At 814, the ransomware process locates shared mapped drives, such as shared mapped drives E-Z. Upon locating the shared mapped drives E-Z, the ransomware process determines if the mapped drives are alphabetically organized. If the ransomware process determines that the shared mapped drives E-Z are not alphabetically organized, then the method proceeds to 816, wherein the ransomware process starts to encrypt files contained within the shared mapped drives E-Z.

At 818, the anti-ransomware application determines if the ransomware process first encrypted honeypot data contained within the shared mapped drives E-Z. If the anti-ransomware application determines that the ransomware process is not encrypting honeypot data contained within the shared mapped drives E-Z, then the method proceeds to 820, wherein the ransomware process has started to encrypt files within valid shared resources of the system 100.

At 822, the Central Monitoring Module 202 and/or the Satellite Monitoring Module 204 during its monitoring of selected activities within the system 100, will detect the encryption of files within valid shared resources of the system 100. Once the volume of the encryption of the files has exceeded defined thresholds, the Trigger Rule Module 210 will determine such detected activity is a ransomware attack, wherein the Action Rule Module 212 will undertake security actions to mitigate the ransomware attack. The Action Rule Module 212 will invoke at least one Action Script to terminate access to all shared resources on the system 100. In addition, the Action Rule Module 212 will invoke at least one Action Script to automatically shut down the infected client device 120.

If at 814, the ransomware process determines that the shared mapped drives E-Z are not alphabetically organized, then the method proceeds to 824. At 824, the ransomware process starts encrypting files stored on the first and last shared drives, which are honeypot drives populated with honeypot data. From step 824, the method proceeds to 822, which was discussed above.

From step 822, the method proceeds to 826, wherein after the Action Rule Module 212 has invoked at least one Action Script to terminate access to all shared resources on the system 100, the ransomware process will only be able to encrypt honeypot data. At 828, the network administrator may remove the infected client device 120 from the system 100, either remotely or physically. At 830, any encrypted files on the shared mapped drives E-Z may be restored from the last backup. The storage medium or drive for the infected client device 120 is replaced and a new operating system is installed.

Figure 9:
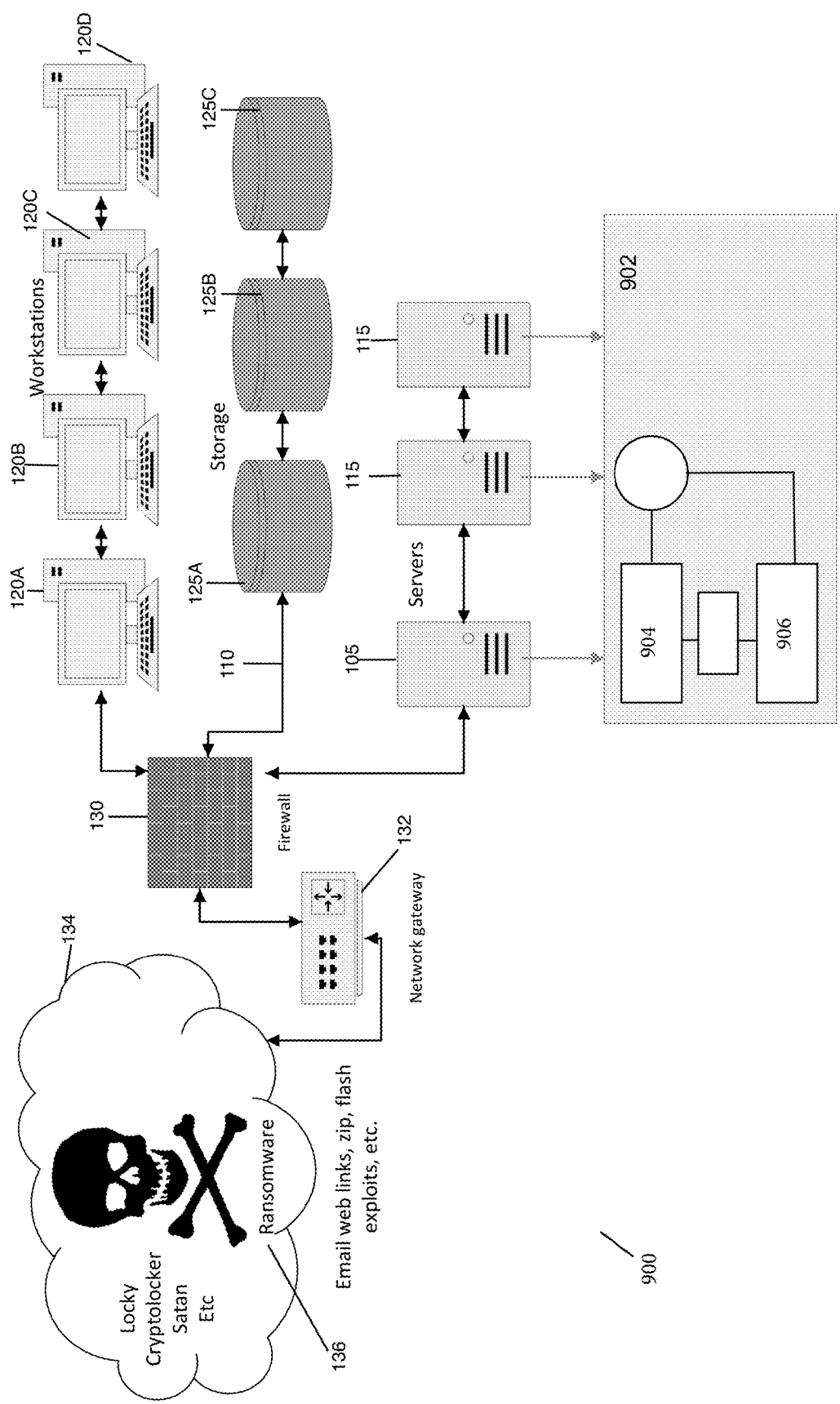
FIG. 9 is a system diagram illustrating an example embodiment of an environment having multiple anti-ransomware applications operating according to the present disclosure.

FIG. 9 is a high-level block diagram illustrating a system environment 900 having multiple anti-ransomware applications operating to prevent new ransomware from infecting one or more components of the system 900 or remove or disable existing ransomware that is already present on the system 900. Similar to the system 100 as shown in FIG. 1, the system 900 includes comprises a server 105, an internal network 110, one or more storage devices 115, one or more client devices 120, and one or more one auxiliary servers 125. The system 900 may further comprise a network gateway 132 to control communication with the external network 134 and a firewall 130 positioned between the network gateway 132 and the external network 134. For simplicity and clarity, only server 105, two auxiliary servers 125, a limited number of storage devices 115, and a limited number of client devices 120 are shown; however, other embodiments may include different numbers of servers 105, 125, storage devices 115, and client devices 120. Furthermore, the system environment 100 may include different or additional entities.

In one embodiment, the system 900 comprises an anti-ransomware failover component shown as 902 comprised of multiple anti-ransomware applications, shown as 904 and 906, a shared database 908, and a heartbeat network 910. The anti-ransomware applications 904 and 1006 monitor activities that occur on the system 900 in order to detect, stop, and remove ransomware therefrom. The anti-ransomware applications 904 and 906 function as set forth with respect to FIGS. 2-8. For simplicity and clarity, only two anti-ransomware applications, 904 and 906, are shown; however, other embodiments an anti-ransomware failover component may include any number of anti-ransomware applications.

In one embodiment, anti-ransomware application 904 may function as the primary anti-ransomware application for handing ransomware attacks within the system 900. In one embodiment, the Central Monitoring Module 202 and/or the Satellite Monitoring Module 204 monitor selected activities that occur within the system 900 and may generate a log or report of all monitored activities, which may be stored in the Monitored Activity Detection Database 214 for further processing or analysis. The Central Monitoring Module 202 and/or the Satellite Monitoring Module 204 may detect a suspicious activity on the server 105, auxiliary server 115, one of the client devices 120, or any other component of the system 900. The Trigger Rule Module 210 receives event data associated with one or more monitored activities detected by at least one of the Central Monitoring Module 202 and the Satellite Monitoring Module 204. The Trigger Rule Module 210 analyzes at least a portion of event data generated by the Central Monitoring Module 202 and/or the Satellite Monitoring Module 204 and may determine whether the detected monitored activity may represent a ransomware attack. In response to the determination by the Trigger Rule Module 210 that one or more of the detected monitored activities represents a possible ransomware attack, the Action Script Module 212 may perform one or more security actions in response thereto.

In one embodiment, anti-ransomware application 906 functions as a redundant or backup anti-ransomware application. In the event that the primary anti-ransomware application 904 is unable to monitor activities within the system 900 for a period of time, anti-ransomware application 906 will take over monitoring the system 900 until such time as the anti-ransomware application 904 is returned to service. This allows for redundant anti-ransomware application 906 to continue to monitor activities in the event the primary anti-ransomware application 904 goes offline for a period of time, is unable to exchange data with system components for a period of time, or any other reason the primary anti-ransomware application 904 may be unable to provide monitoring functionality or support to the system 900.

In another embodiment, both anti-ransomware applications 904 and 906 may function in parallel to monitor selected activities within the system 900. In the event that one of the anti-ransomware applications is unable to monitor activities within the system 900 for a period of time, the other anti-ransomware application will take over monitoring activities until the non-functioning anti-ransomware application is returned to service.

In one embodiment, the shared database 908 may store event data associated with one or more monitored activities detected by one or both of the anti-ransomware applications 904 and 1006. As an example, if anti-ransomware application 904 functions as the primary application, event data associated with monitored activities detected by anti-ransomware application 904. In the event, that anti-ransomware application 904 is unable to monitor activities within the system 900 for a period of time, the event data stored in shared database 908 may be accessed by anti-ransomware application 906 in undertaking its monitoring of the system 900. In one embodiment, the shared database 908 may store event data that is duplicative of event data stored in the Monitored Activity Detection Database 214 of anti-ransomware application 904 and/or the Monitored Activity Detection Database 214 of anti-ransomware application 906. In a preferred embodiment, the shared database 908 is SQL database.

In one embodiment, the heartbeat network 910 may connect the components of the anti-ransomware failover component 902 in order to monitor the status of such components. In one embodiment, a portion of the system components may also be connected to the heartbeat system 910. In one embodiment, server 105 and auxiliary servers 125 may also be connected to the heartbeat network 910. In another embodiment, all system components which are to be monitored for ransomware attacks may be connected to the heartbeat network 910.

In operation, each component connected to the heartbeat network 910 is configured to send a heartbeat message at specific intervals to other components on the network. In one embodiment, each component connected to the to the heartbeat network 910 is configured to send a heartbeat message at specific intervals to at least one of the anti-ransomware applications 904 and 906. In such embodiment, if messages stop being sent from one of the components for a predefined time, then at least one of the one of the anti-ransomware applications 904 and 906 recognizes that the component may be offline or otherwise compromised. For example, if one of the auxiliary servers 125 stops sending heartbeat messages, then anti-ransomware application 904 may determine that auxiliary server 125 has been comprised by a ransomware attack and will shut down auxiliary server 125.

In another embodiment, each component connected to the to the heartbeat network 910 is configured to send a heartbeat message at specific intervals to at least one of the anti-ransomware applications 904 and 906. In such embodiment, if messages stop being received from one of the anti-ransomware applications 904 and 906, then the components connected to the heartbeat network 910, may perform security actions. For example, if one of the auxiliary servers 125 stops receiving heartbeat messages from anti-ransomware application 904, then in response, auxiliary server 125 may automatically terminate all shared resources and/or shut down.

Operational embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a DVD disk, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC or may reside as discrete components in another device.

Furthermore, the one or more versions may be implemented as a method, apparatus, or article of manufacture using standard programming and/or engineering techniques to produce software, firmware, hardware, or any combination thereof to control a computer to implement the disclosed embodiments. Non-transitory computer readable media may include but are not limited to magnetic storage devices (e.g., hard disk, floppy disk, magnetic strips), optical disks (e.g., compact disk (CD), digital versatile disk (DVD)), smart cards, and flash memory devices (e.g., card, stick). Those skilled in the art will recognize many modifications may be made to this configuration without departing from the scope of the disclosed embodiments.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those of ordinary skill in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A system for mitigating the effects of ransomware attacks, comprising:
    a plurality of computing devices interconnected via a network;
    a plurality of storage devices, wherein each storage device is configured to store a plurality of data files in a plurality of file directories, wherein a select number of the plurality of storage devices include at least one shared file directory for storing a plurality of data files therein, wherein each shared file directory is configured to allow access to data files stored therein to a select number of the plurality of computing devices via the network;
    a ransomware detection component connected to a select number of the plurality of computing devices and storage devices via the network, wherein the ransomware detection component is configured to detect possible ransomware attacks and comprises,
        a honeypot deployment module configured to selectively deploy a plurality of honeypot data items into a select number of the plurality of storage devices, wherein a select number of the plurality of honeypot data items deployed are accessible to selected users of the system, wherein the honeypot data items comprise honeypot drives, honeypot files, and combinations thereof;
        a monitoring module configured to
            monitor a plurality of activities executed on data files stored in a select number of the plurality of storage devices,
            detect activities executed on data files that conform to at least one of a predefined set of activities, and
            generate a plurality of event data associated with each detected activity;
        a trigger rule module configured to determine, based on event data associated with each detected activity, whether a detected activity is indicative of a ransomware attack by a third party not authorized to execute such detected activity;
        an action script module configured to execute, based on a determination by the trigger rule module that a detected activity is indicative of a ransomware attack, at least one action script to mitigate access to shared data files should the detected activity be a ransomware attack; and
        a database module configured to store at least a portion of event data associated with detected activities.

2. The system of claim 1, wherein honeypot deployment module deploys at least one honeypot data item into a majority of the shared file directories.

3. The system of claim 1, wherein the plurality of activities monitored comprises activities associated with predefined file types, predefined file activities, predefined directory activities, predefined user activities, predefined processes, and combinations thereof.

4. The system of claim 1, wherein the trigger rule module is configured to:
    determine whether an occurrence of a detected activity exceeds a predetermined threshold level associated with such activity; and
    based on whether the predetermined threshold is exceeded, determine whether the detected activity is indicative of a ransomware attack.

5. The system of claim 4, wherein the database is configured to store threshold data associated with a plurality of predetermined threshold levels with respect to selected activities executed on data files; wherein the trigger rule module is configured to access threshold data associated with a selected detected activity to determine whether the occurrence thereof exceeds the predetermined threshold level.

6. The system of claim 1, wherein at least one action script comprises at least one security action selected from the group consisting of preventing at least one process from accessing data files stored in at least one of the plurality of storage devices; suspending at least one process executing on data files stored in at least one of the plurality of storage devices; creating a backup copy of at least a portion of data files stored in at least one of the plurality of storage devices; terminating processes on at least one of the plurality of storage devices and plurality of computing devices; generating at least one alert in response to a determination that a detected activity is indicative of a ransomware attack; restricting access to the system of at least one user associated with a detected activity that is determined to be indicative of a ransomware attack; quarantining at least one of the plurality of storage devices and plurality of computing devices on which a detected activity is executed that is determined to be indicative of a ransomware attack; and combinations thereof.

7. The system of claim 1, wherein the database is configured to store a plurality of action scripts associated with a plurality of detected activities executed on data files; wherein the action script module is configured to access at least one action script associated with a selected detected activity to mitigate access to shared data files should the detected activity be a ransomware attack.

8. The system of claim 1, wherein the ransomware detection component comprises a plurality of monitoring modules, wherein each monitoring module is configured to:
monitor a plurality of activities executed on data files stored in a select number of the plurality of storage devices;
detect activities executed on honeypot data items that conform to at least one of a predefined set of activities;
generate a plurality of event data associated with each detected activity; and
transmit at least a portion of the generated event data to a select number of a remainder of the plurality of monitoring modules via the network for processing thereby.

9. The system of claim 1, wherein the ransomware detection component further comprises an input/output interface configured to receive a plurality of configuration data associated with configuration parameters for at least one of the at least one monitoring module, the trigger rule module, the action script module, the database, and combinations thereof.

10. A system for mitigating the effects of ransomware attacks, comprising:
a plurality of computing devices interconnected via a network;
a plurality of storage devices, wherein each storage device is configured to store a plurality of data files in a plurality of file directories, wherein a select number of the plurality of storage devices include at least one shared file directory for storing a plurality of data files therein, wherein each shared file directory is configured to allow access to data files stored therein to a select number of the plurality of computing devices via the network;
a plurality of ransomware detection components, wherein each ransomware detection component is connected to a select number of the plurality of computing devices and storage devices via the network, wherein each ransomware detection component is operable to detect possible ransomware attacks and comprises:
a honeypot deployment module configured to selectively deploy a plurality of honeypot data items into a select number of the plurality of storage devices, wherein a select number of the plurality of honeypot data items deployed are accessible to selected users of the system, wherein the honeypot data items comprise honeypot drives, honeypot files, and combinations thereof;
at least one monitoring module configured to
monitor a plurality of activities executed on data files stored in the plurality of storage devices,
detect activities executed on data files that conform to at least one of a predefined set of activities, and
generate a plurality of event data associated with each detected activity;
a trigger rule module configured to
determine, based on event data associated with each detected activity, whether a detected activity is indicative of a ransomware attack by a third party not authorized to execute such detected activity, and
generate a plurality of event analysis data therefrom;
an action script module configured to execute, based on a determination by the trigger rule module that a detected activity is indicative of a ransomware attack, at least one action script to mitigate access to shared data files should the detected activity be a ransomware attack;
a database module configured to store at least a portion of event data associated with detected activities; and
an input/output device configured to exchange at least a portion of least one of event data associated with detected activities, event analysis data, at least one action script, status update messages, and combinations thereof with a select number of a remainder of the plurality of ransomware detection components via the network.

11. The system of claim 10, further comprising an anti-ransomware failover component connected to each of the plurality of ransomware detection components via the network, wherein the anti-ransomware failover component comprises:
a failover processor for controlling the anti-ransomware failover component;
a heartbeat component operatively connected to the failover processor and controlled in part by the failover processor, wherein the heartbeat component is operable to receive a plurality of status update communications from each of the ransomware detection components connected via the network; and
a shared database connected to each of the ransomware detection components, wherein the shared database is configured to store a plurality of event data associated with detected activities, event analysis data, at least one action script, and combinations thereof received from each of the ransomware detection components;
wherein the failover processor is operable to:

generate at least one control signal for each ransomware detection component to transmit a status update message to the heartbeat component at specific intervals;
receive a plurality of status update messages from the heartbeat component and generate status data for each ransomware detection component therefrom;
determine, based on at least a portion of the status data, whether a selected ransomware detection component is functioning within predetermined parameters;
in response to a determination that the selected ransomware detection component is not functioning within predetermined parameters, generate at least one command to restrict ransomware detection functionality of the non-functioning ransomware detection component; and
transmit at least one command to a select number of remainder of the plurality of ransomware detection components to undertake at least a portion of the ransomware detection functionality of the non-functioning ransomware detection component.

12. A method for mitigating the effects of ransomware attacks within a networked system, wherein the system comprises
(a) a plurality of computing devices interconnected via a network,
(b) a plurality of storage devices, wherein each storage device is configured to store a plurality of data files in a plurality of file directories, wherein a select number of the plurality of storage devices include at least one shared file directory for storing a plurality of data files therein, wherein each shared file directory is configured to allow access to data files stored therein to a select number of the plurality of computing devices via the network, and
(c) a ransomware detection component connected to a select number of the plurality of computing devices and storage devices via the network for detecting possible ransomware attacks, wherein the ransomware detection component comprises (i) a honeypot deployment module, (ii) a monitoring module, (iii) a trigger rule module, (iv) an action script module, and (v) a database module, the method comprising:
deploying, via the honeypot deployment module, a plurality of honeypot data items into a select number of the plurality of storage devices, wherein a select number of the plurality of honeypot data items deployed are accessible to selected users of the system, wherein the honeypot data items comprise honeypot drives, honeypot files, and combinations thereof;
monitoring, via the monitoring module, a plurality of activities executed on data files stored in a select number of the plurality of storage devices,
detecting, via the monitoring module, activities executed on data files that conform to at least one of a predefined set of activities, and generating a plurality of event data associated with each detected activity;
determining, via the trigger rule module, based on event data associated with each detected activity, whether a detected activity is indicative of a ransomware attack by a third party not authorized to execute such detected activity, and generating a plurality of event analysis data therefrom; and
executing, via the action script module, based on a determination by the trigger rule module that a detected activity is indicative of a ransomware attack, at least one action script to mitigate access to shared data files should the detected activity be a ransomware attack.

13. The method of claim 12, further comprising storing at least a portion of at least one of the plurality of event data associated with detected activities, the plurality of event analysis data, and combinations thereof in the database module.

14. The method of claim 12, at least one honeypot data item is deployed into a majority of the shared file directories.

15. The method of claim 12, wherein the plurality of activities monitored comprises activities associated with predefined file types, predefined file activities, predefined directory activities, predefined user activities, predefined processes, and combinations thereof.

16. The method of claim 12, further comprising:
storing threshold data associated with a plurality of predetermined threshold levels with respect to selected activities executed on data files in the database module;
determining, via the trigger rule module, whether an occurrence of a detected activity exceeds a predetermined threshold level associated with such activity; and
based on whether the predetermined threshold is exceeded, determining, via the trigger rule module, whether the detected activity is indicative of a ransomware attack.

17. The method of claim 12, wherein at least one action script comprises at least one security action selected from the group consisting of preventing at least one process from accessing data files stored in at least one of the plurality of storage devices; suspending at least one process executing on data files stored in at least one of the plurality of storage devices; creating a backup copy of at least a portion of data files stored in at least one of the plurality of storage devices; terminating processes on at least one of the plurality of storage devices and plurality of computing devices; generating at least one alert in response to a determination that a detected activity is indicative of a ransomware attack; restricting access to the system of at least one user associated with a detected activity that is determined to be indicative of a ransomware attack; quarantining at least one of the plurality of storage devices and plurality of computing devices on which a detected activity is executed that is determined to be indicative of a ransomware attack; and combinations thereof.

18. The method of claim 12, further comprising:
storing a plurality of action scripts associated with a plurality of detected activities executed on data files in the database module; and
accessing, by the action script module, at least one action script associated with a selected detected activity and executing the at least one action script to mitigate access to shared data files should the detected activity be a ransomware attack.

19. The method of claim 12, wherein the ransomware detection component further comprises a plurality of monitoring modules, the method further comprising:
monitoring, by each of the monitoring modules, a plurality of activities executed on data files stored in a select number of the plurality of storage devices;
detecting, by each of the monitoring modules, activities executed on honeypot data items that conform to at least one of a predefined set of activities;
generating, by each of the monitoring modules, a plurality of event data associated with each detected activity; and
transmitting, by each of the monitoring modules, at least a portion of the generated event data to a select number of a remainder of the plurality of monitoring modules via the network for processing thereby.

20. The method of claim 12, wherein the ransomware detection component further comprises an input/output interface, the method further comprising receiving, via the input/output interface, a plurality of configuration data associated with configuration parameters for at least one of the monitoring module, the trigger rule module, the action script module, the database, and combinations thereof.

* * * * *